United States Patent [19]

Yasuda et al.

[11] Patent Number: 4,545,244
[45] Date of Patent: Oct. 8, 1985

[54] ULTRASONIC FLOW METER

[75] Inventors: Yoshichiro Yasuda, Tokyo; Seio Satoh, Chiba, both of Japan

[73] Assignee: Ebara Corporation, Tokyo, Japan

[21] Appl. No.: 215,374

[22] Filed: Dec. 11, 1980

[30] Foreign Application Priority Data

Dec. 16, 1979 [JP] Japan .................................. 54-163007

[51] Int. Cl.⁴ .............................................. G01F 1/66
[52] U.S. Cl. .................................. 73/195; 73/861.25; 73/861.28
[58] Field of Search ........... 73/861.18, 861.25, 861.28, 73/861.31, 195, 118 A, 197

[56] References Cited

U.S. PATENT DOCUMENTS 3,766,517 10/1973 Fahrbach ........................ 73/861.25
3,987,673 10/1976 Hansen .............................. 73/861.25
4,028,938 6/1977 Eck .................................... 73/861.31

FOREIGN PATENT DOCUMENTS 0160167 11/1979 Japan ................................. 73/861.25
0113974 9/1980 Japan ................................. 73/861.25

Primary Examiner—Charles A. Ruehl
Attorney, Agent, or Firm—Oblon, Fisher, Spivak, McClelland & Maier

[57] ABSTRACT

An inexpensive flow meter with a special arrangement of a minimum of transducers always provides an accurate measure of flow of the fluid in a conduit irrespective of the condition of the fluid. Mode control switching circuitry including fluid condition detecting means selectively energizes one or two transmitters in the transducers each of which then feeds a beam of ultrasonic waves to the fluid. Receiver means in the transducers selectively receives both the transmission (transit) mode waves and the reflection (Doppler-shifted) mode waves in accordance with the current condition of the fluid. In one embodiment, the beam of ultrasonic waves uses a single path of travel extending from a transmitter and a receiver while in another embodiment, it uses dual parallel paths extending from two transducers and two receivers.

19 Claims, 15 Drawing Figures

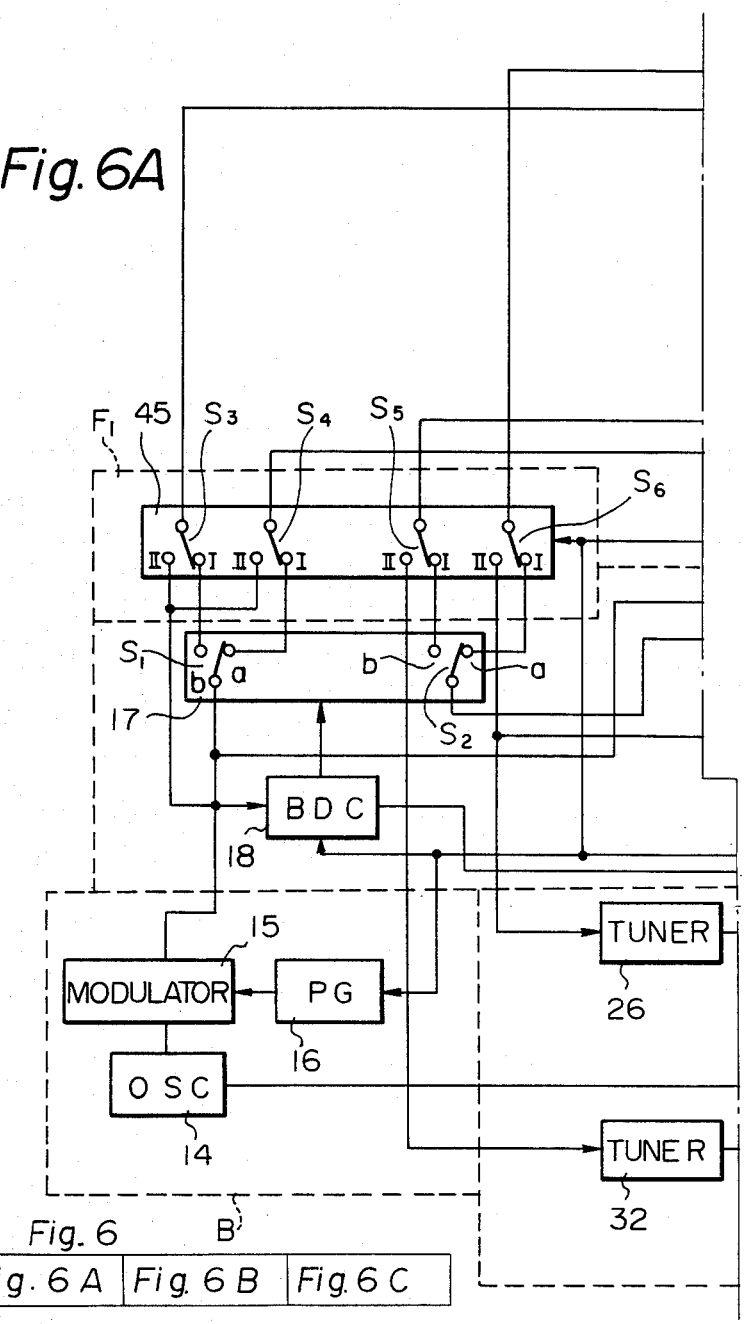

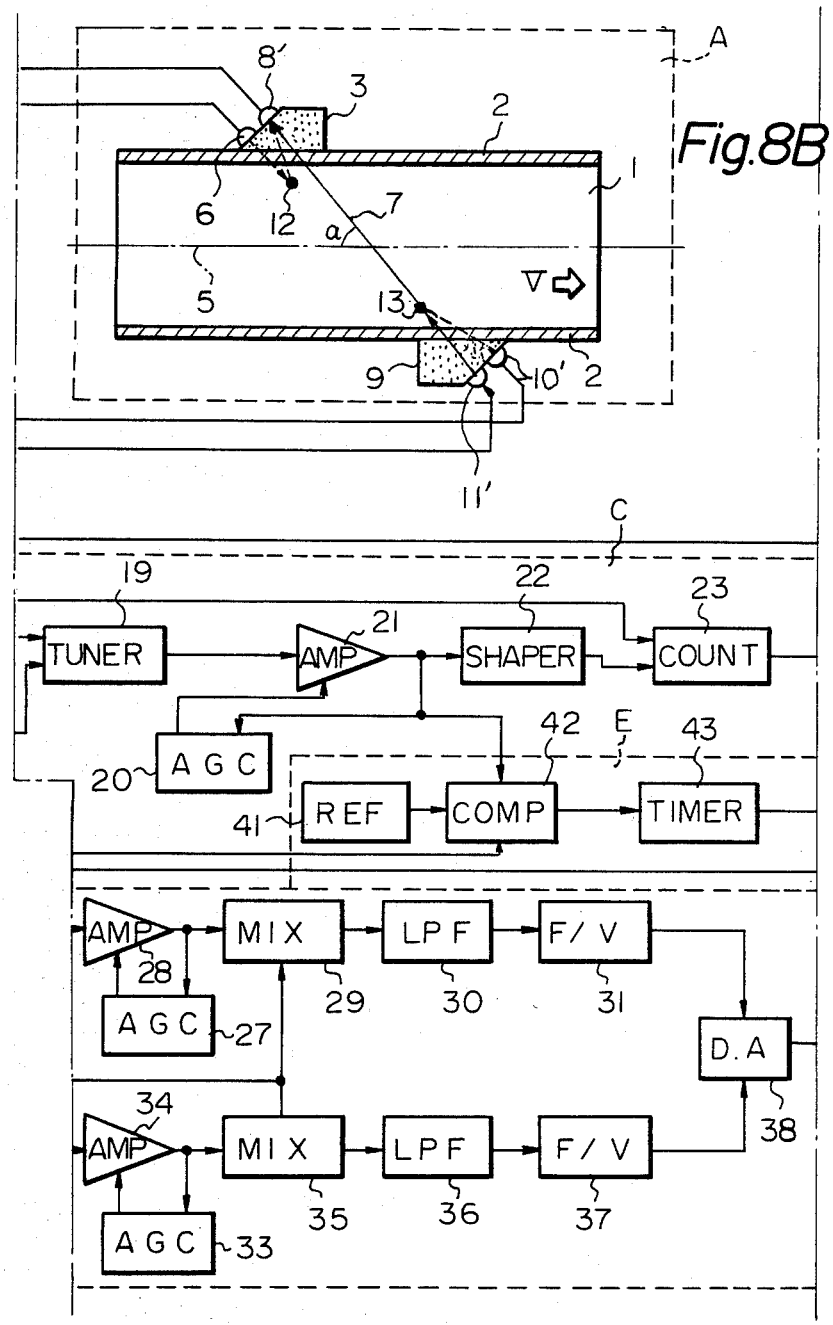

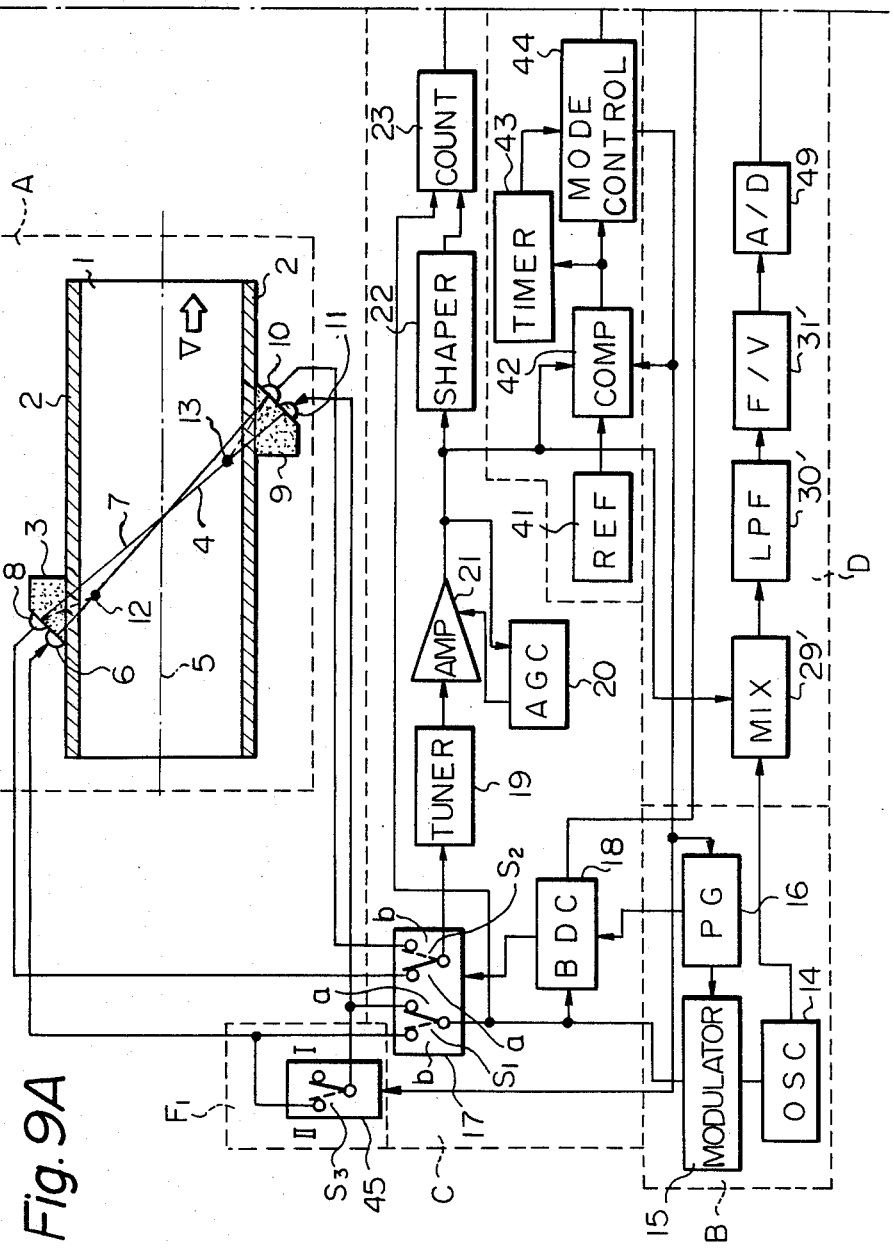

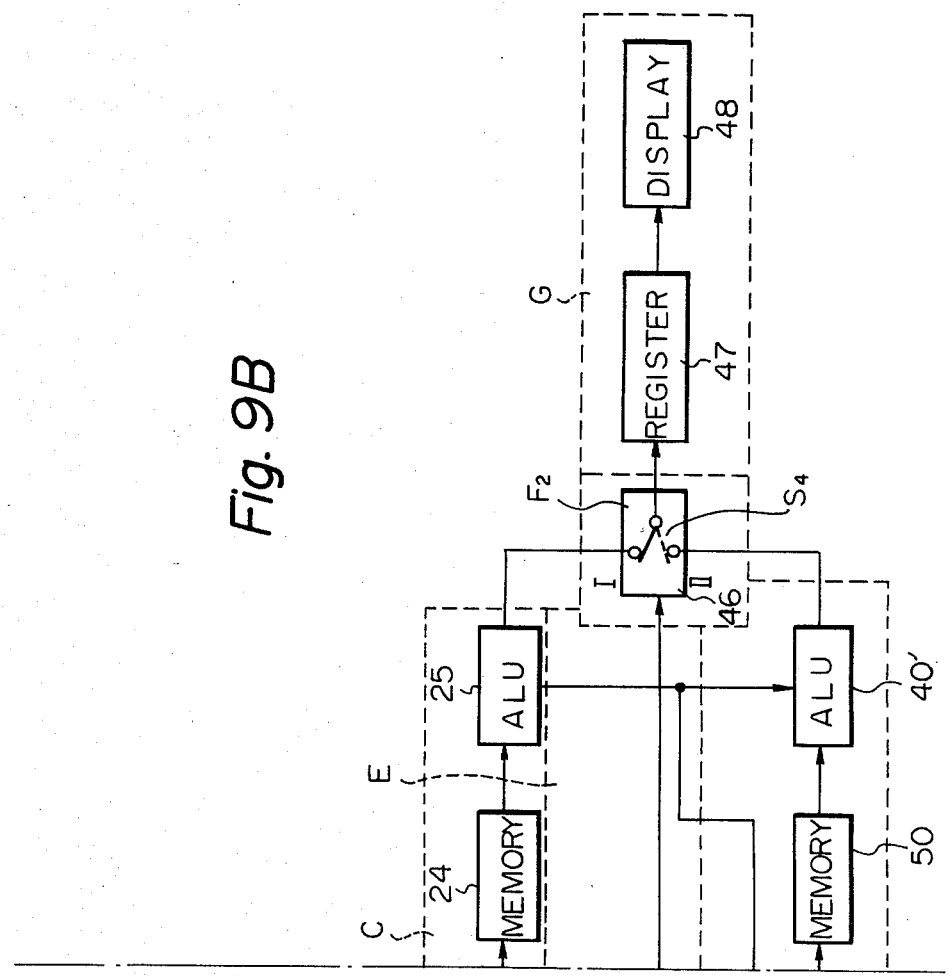

4,545,244

ULTRASONIC FLOW METER

FIELD OF THE INVENTION

This invention relates to an ultrasonic flow meter for measuring the velocity of the flow (change of position/unit time) and/or the flow rate (volume/unit time).

The term "particle" refers, herein to acoustic reflecting object in the fluid, such as "air bubble" and/or "solid particle".

BACKGROUND OF THE INVENTION

Sing-around method, phase-difference method, time-difference method are wellknown techniques for measuring the velocity of flow and/or the flow rate of clear water. Particularly, the time-difference technique has been frequently used. This system typically includes a pair of transducers disposed obliquely in a facing relationship and positioned upstream and downstream in the path of travel of the liquid so that the velocity vector of the liquid changes the propagation speed of the ultrasonic wave along a path from the transmitter to the receiver transducer.

In one mode, the upstream-positioned transducer transmits ultrasonic signals to the downstream-positioned transducer to obtain the time for the acoustic wave traveling or being propagated downstream while in another mode, the downstream-positioned transducer transmits ultrasonic signals to the upstream-positioned transducer to obtain the time for the acoustic wave traveling or being propagated upstream. The velocity of the liquid is determined from the time difference between the upstream and downstream modes of propagation.

However, any of the above-mentioned three techniques is a transmission method in which it is assumed that ultrasonic waves can travel through the liquid medium between the sound transmitter and receiver and reach the latter without significant loss or attenuation.

Air bubbles and solids contained in the liquid are obstacles to ultrasonic waves and scatter them. For this reason, the transmission method is applicable only to clear water which contains few or no air bubbles and/or solids.

The Doppler shift or reflection method is also utilized to measure the velocity and/or the flow rate of fluid. In a typical Doppler shift ultrasonic flow meter, an acoustic transmitter and receiver are mounted on the opposite sides of a test conduit in which fluid flows. The transmitter transmits ultrasonic waves which then travel, for example, upstream with respect to the direction of the fluid containing air bubbles and/or solids, and are scattered by those particles. Part of the scattered or reflected waves comes into the field of the receivers and is observed as a Doppler-shifted signal. The value of the Doppler shift relates to the velocity or average velocity of those particles in the fluid near the central axis which have received the transmitted waves and reflected them toward the receiver. It is clearly understood that this method cannot be applied to flow measurement of clear water which does not include air bubbles or solids.

Although the existence of particles or reflecting objects is a pre-requisite for the Doppler-shift flow measurement, the prior art Doppler-shift flow meters are not applicable to very polluted water containing a large number of particles.

There exists a great need for continuous measurement of flow of a liquid in which pollution degree varies with time, such as the industrial waste water of the type for which the total amount of pollutants is regulated. To achieve this in the prior art, at least two types of flow measuring equipment are required. This complicates the transportation and installation work. Further, the operator must monitor the level of pollution and decide which type of the equipment to switch into operation. This requires high skill on the part of the operator.

SUMMARY OF THE INVENTION

It is an object of this invention to provide an ultrasonic flow meter capable of measuring the flow of the fluid irrespective of the condition thereof.

Another object of this invention is to provide an ultrasonic flow meter capable of measuring the velocity of flow and/or rate of flow of fluid with low degree pollution.

Another object of this invention is to provide an ultrasonic flow meter of the Doppler-shift type capable of measuring the velocity of flow and/or rate of flow of highly polluted fluid.

Yet another object of this invention is to provide an ultrasonic flow meter capable of measuring the flow of fluid with high accuracy.

Still another object of this invention is to provide an ultrasonic flow meter which can continuously measure the velocity of flow and/or rate of flow of the fluid.

A further object of the invention is to provide an ultrasonic flow meter having two modes of operation in accordance with the condition of the fluid.

A still further object of the invention is to provide an ultrasonic flow meter which detects a transmission mode ultrasonic signal in response to a first condition of the fluid and also detects a reflection mode ultrasonic signal in response to a second condition of the fluid.

Another object of this invention is to provide an ultrasonic flow meter which is inexpensive to manufacture.

A further object of this invention is to provide an ultrasonic flow meter which is easy to transport and install and remove.

A further object of this invention is to provide an automatic flow meter which does not require a person's attention.

A still further object of the invention is to provide an ultrasonic flow meter including two signal processing means which selectively operate in response to both low and high degree of pollution of water.

In accordance with one aspect of this invention, there is provided a reflection type or Doppler shift ultrasonic flow meter including an acoustic transmitter and an acoustic receiver that is disposed very close to the transmitter. The beam of ultrasonic waves from the transmitter is reflected in the fluid by particles therein and then returns to the acoustic receiver. Since the distance of travel of the waves from the transmitter and the receiver through fluid is relatively short. Accordingly, the flow meter system is applicable to those fluids that contain a large number of particles such as air bubbles and solids.

In accord with a further aspect of the invention, there is provided an ultrasonic Doppler shift flow meter including two sets of acoustic transmitter and receiver with one set positioned downstream the other and in facing relationship thereto. This second system improves the signal-to-noise ratio of the mentioned system.

In accordance with a further aspect of this invention, there is provided an ultrasonic flow meter having Doppler shift measuring means and second means for measuring the time of propagation for the ultrasonic wave from a downstream-positioned acoustic transmitter to an upstream-positioned acoustic receiver and third means for measuring the time of propagation from an upstream-positioned transmitter to a downstream-positioned receiver. These transmitters and receivers are disposed as described with respect to the above second system. The ultrasonic flow meter automatically switches between transmission and reflection modes of operation. Accordingly, for less polluted fluid, the second and third means operate. While, for more polluted fluid, the Doppler shift measuring means operates, whereby the flow meter continuously provides a good measure of the flow velocity and/or flow rate of the fluid, whatever the degree of pollution of the fluid.

BRIEF DESCRIPTION OF THE DRAWINGS

The above and other objects, features and advantages will become more apparent from the description by reference to the accompanying drawings in which:

FIGS. 6A, 6B, and 6C are block diagrams of another embodiment of this invention;

FIGS. 8A, 8B, and 8C are block diagrams of another embodiment of this invention;

FIGS. 9A and 9B are block diagrams of another embodiment of this invention; and

DETAILED DESCRIPTION OF THE PREFERRED EMBODIMENT

Figure 1:
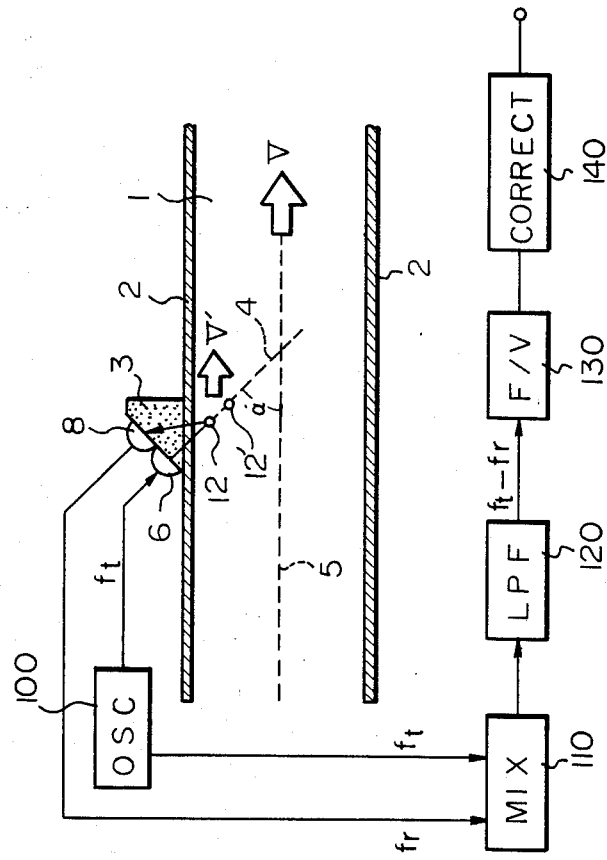
FIG. 1 is a block diagram of an embodiment of this invention.

FIG. 1 is a block diagram showing the arrangement of circuit components in one embodiment of this invention, wherein a transmitting transducer 6 is fixed adjacent a receiving transducer 8 on the inclined surface of a plastic wedge 3 positioned in close contact with the outer wall of a pipe 2. An oscillator 100 generates an electrical signal having a frequency ft which is supplied to the transducer 6 that transmits an ultrasonic signal having a frequency ft and a waveform as shown in curve (A) of FIG. 2. The ultrasonic signal is transmitted through the plastic wedge 3 while it forms a beam having an axis 4 that crosses the central axis 5 of the pipe 2 at an angle of $\alpha$. The ultrasonic signal hits a solid particle 12 that flows near the wall of the pipe 2, and part of the signal is reflected to be received by the transducer 8. When the transducer 6 supplies a sinusoidal ultrasonic signal as shown in curve (A) of FIG. 2, the transducer 8 receives an ultrasonic signal having a waveform as shown in curve (B) of FIG. 2 having a frequency fr which is lower than the frequency ft of the transmitted ultrasonic signal because of the Doppler effect due to a vector component of the velocity of the solid particle 12 on the axis 4 in the direction toward the central axis 5. In addition, as indicated by $t_1$ in curve (B) of FIG. 2, the received ultrasonic signal has a delay time with respect to the transmitted ultrasonic signal. The delay time is equal to the time required for the ultrasonic signal transmitted to pass into the pipe 2 through the plastic wedge 3, reach the solid particle 12 by going through the fluid 1 and be reflected by that particle to be received by the transducer 8. When the solid particle 12 moves away, similar solid particles successively appear on the axis 4 to keep the supply of the sinusoidal signal shown in curve (B) of FIG. 2.

Figure 2:
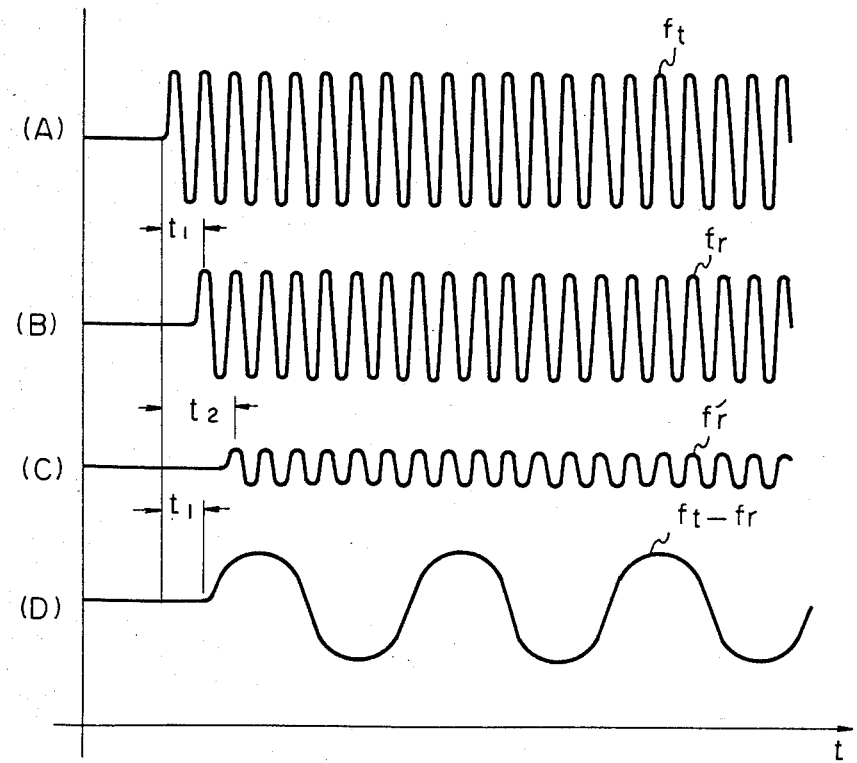
FIG. 2 is a time chart illustrating principal waves in the embodiment in FIG. 1.

Curve (C) of FIG. 2 shows the waveform of a signal reflected from another solid particle 12' which is also present on the axis 4 but is closer to the central axis 5 than the particle 12, and if the distribution of flow rate is substantially uniform, the frequency fr' of the reflected signal is almost equal to the frequency fr of the signal reflected from the solid particle 12 present close to the particle 12'. But since the ultrasonic signal is reflected by the solid particle 12, only a very weak ultrasonic signal reaches the solid particle 12', and in addition, the signal reflected from the solid particle 12' is sometimes blocked by the solid particle 12 and in consequence, the transducer 8 receives an extremely attenuated signal from the solid particle 12'.

Accordingly, in the circuit configuration shown in FIG. 1, the frequency of the reflected signal received by the transducer 8 is determined by the Doppler shift caused by a change in the rate of the fluid flowing in the vicinity of the wall of the pipe 2, not by the fluid flowing in the center of the pipe 2. In curve (C) of FIG. 2, the delay time $t_2$ is required for the ultrasonic signal transmitted to go to and come from the solid particle 12', and is greater than the delay time $t_1$ since the solid particle 12' is more remote from the transducer 6 than the solid particle 12.

The ultrasonic signal received by the transducer 8 is supplied to a mixer 110 in the form of an electrical signal having a frequency of fr. The mixer 110 also receives an electrical signal having a frequency ft from the oscillator 100, and supplies a low-pass filter 120 with an output signal as shown in curve (D) of FIG. 2 having a frequency (ft−fr) in addition to the electrical signals having frequencies of ft and fr. The low-pass filter 120 delivers an output composed of a signal component having a frequency (ft−fr) which is much lower than ft or fr. As already mentioned, the frequency (ft−fr) is determined by the Doppler shift caused by a change in the velocity of the fluid near the wall of the pipe 2, and the relation between the (ft−fr) and fluid velocity is expressed by the following equation:

$$V = \frac{C(ft - fr)}{2ft \cdot \cos\alpha} = K(ft - fr)$$

wherein V=the velocity of the fluid near the wall of the pipe, $\alpha$=the angle formed by the axis of the beam of the ultrasonic signal from the transmitter 6 and the central axis of the pipe, C=the propagation speed of the ultrasonic signal for V=0, and thus K=constant.

Then the output signal from the low-pass filter 120 is supplied to a frequency discriminator 130 which produces an output voltage proportional to the frequency difference (ft−fr) which is further supplied to a corrector 140 which adjusts the voltage output with the constant K and makes a necessary correction based on the actually measured distribution of flow velocity, to thereby produce an output voltage that represents the average flow velocity in the pipe 2. The corrector 140 provides an output voltage that indicates the flow rate (volume/unit time) by making an additional correction in which the average flow velocity (distance of travel/unit time) is multiplied by a constant for the crossectional area of the pipe 2.

In the illustrated embodiment of ultrasonic flow meter according to this invention, the transmitter and receiver transducers (6 and 8) of only one set are positioned adjacent each other so the only Doppler shift that can be utilized is that caused by the differential frequency (ft−fr) which represents the difference between the frequency ft of an ultrasonic signal transmitted from the transducer 6 and the frequency fr of an ultrasonic signal received by the transducer 8. One defect of this system is that as the flow rate of the fluid decreases, so does the differential frequency (ft−fr), making accurate measurement of the flow rate difficult. Another defect is that although when considered as an average particle the solid particle 12 that reflects ultrasonic signals moves parallel to the wall of the pipe 2 or the central axis 5, some, in fact move in a slightly serpentine path instead of taking a linear course that is completely parallel to the central axis. A vector component of the velocity of the particle 12 in the direction of the axis 4 that is produced by such serpentine motion of the particle 12 becomes an error-causing factor in the frequency range of the ultrasonic signal reflected from the particle 12 and causes the frequency of the ultrasonic signal received by the transducer 8 to fluctuate, i.e. become higher or lower than fr. As a result, the measured value of flow velocity and corresponding flow rate fluctuates to provide an output that contains a significant error.

Therefore, another purpose of this invention is to provide an ultrasonic flow meter that uses two sets of transmitting and receiving transducers and determines the difference of output signals delivered from the two receiver transducers to amplify the shift of frequency due to the Doppler shift and offset a noise component in the frequency range due to such factors as the serpentine motion of solid particles in the fluid.

Figure 3:
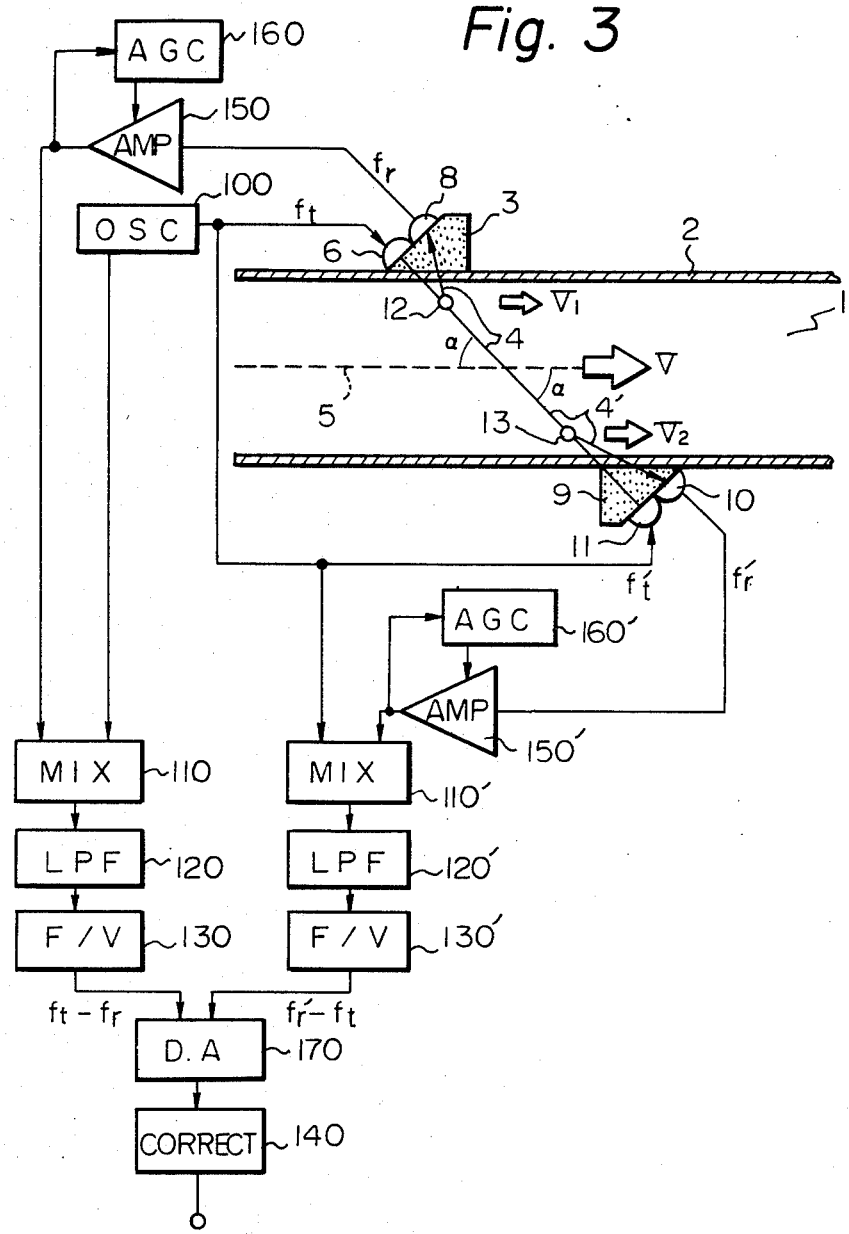
FIG. 3 is a block diagram of another embodiment of the invention.

FIG. 3 is a block diagram showing the arrangement of circuit components in another embodiment of this invention, wherein like numerals identify like components; a second transmitting transducer 11 is fixed adjacent a second receiving transducer 10 on the inclined surface of a plastic wedge 9 so that the axis 4' of the ultrasonic signal beam transmitted forms an angle α with respect to the central axis 5 of the pipe 2. The ultrasonic signal having a frequency ft transmitted from the first transmitting transducer 6 is reflected from the solid particle 12 and is received by the first receiving transducer 8 which converts said signal into an electrical signal. Since the axis 4 of the ultrasonic signal beam is such that a vector component of the velocity of the fluid 1 in the direction of the axis 4 points toward the central axis 5, the frequency fr of the reflected wave having the Doppler shift due to the movement of the solid particle 12 in the direction of the central axis is lower than the frequency ft of the ultrasonic signal transmitted. Accordingly, when the first transmitting transducer supplies a sinusoidal wave having a frequency ft, the first receiving transducer 8 delivers a sinusoidal signal having a frequency fr and a waveform as shown in curve (A) of FIG. 4. But actually, because of the vector component of the velocity of the solid particle 12 in the direction of the axis 4 that is caused by the serpentine motion of the particle 12, the frequency of the reflected wave received at the first receiving transducer 8, i.e. the frequency of the electrical signal supplied from the first receiver transducer 8 fluctuates, i.e. becomes greater or smaller than fr by the amount of $\Delta f_N$. An amplifier 150 amplifies such electrical signal and supplies the amplified signal to the mixer 110. The gain of the amplifier 150 is so adjusted by an automatic amplitude adjusting unit or AGC element 160 that it keeps delivering an output signal having a constant amplitude. In the embodiment illustrated, even if there is a change in the relative position of the first transducer 6 and the first receiver transducer 8 or in the nature of the solid particle 12 in the fluid 1, an electrical signal having a frequency fr and a constant amplitude is kept supplied to the mixer 110, thus minimizing any false measurement due to the change in the amplitude of the signal supplied to the frequency discriminator 130.

The mixer 110 and low-pass filter 120 operate in the same manner as described in connection with the first embodiment of this invention by reference to FIG. 1, and the low-pass filter 120 supplies the frequency discriminator 130 with a low-frequency signal having a frequency $ft-(fr \mp \Delta f_N)$ and a waveform as shown in curve (B) of FIG. 4. In response to such low-frequency signal, the frequency discriminator 130 produces an output signal as shown in curve (C) of FIG. 4. In curve (C) of FIG. 4, $\Delta E$ is an output signal that is produced as a result of the Doppler shift (ft−fr) due to the movement of the solid particle 12 in the direction of the central axis 5 which is detected by the first transmitter transducer 6 and the first receiver transducer 8, and $\Delta E_N$ is the effective value of a ripple component that is produced as a result of a frequency change $\Delta f_N$ that is caused by the serpentine motion of the solid particle 12.

The second transmitting transducer 11 and the second receiving transducer 10 operate in the same manner as the first transmitting transducer 6 and the first receiving transducer 8, and the second receiving transducer 10 produces an electrical signal having a frequency fr'. In the illustrated arrangement of the second transmitting transducer 11 and the second receiving transducer 10, the axis 4' of the ultrasonic signal beam is so formed that a vector component of the velocity of the fluid 1 in the direction of the axis 4 points in a direction opposite to that of the central axis 5, and hence, the frequency fr' of the reflected wave having the Doppler effect due to the movement of the solid particle 13 is higher than the frequency ft of the ultrasonic signal transmitted. Accordingly, the second receiving transducer 10 provides a sinusoidal signal that becomes higher or lower than the frequency fr' by the amount $\Delta f_{N'}$ as shown in curve (D) of FIG. 4. In response to such electrical signal, the second amplifier 150', automatic amplitude adjusting unit 160', mixer 110', low-pass filter 120' and frequency discriminator or frequency-voltage converter 130' operate in the manner entirely the same as when they operate to process the signal from the first receiving transducer 8. The second frequency discriminator 130' is supplied with a low-frequency signal having a frequency $(fr' \mp \Delta f_{N'}) - ft$ as shown in curve (E) of FIG. 4, thereby producing an output signal as shown in curve (F) of FIG. 4. In curve (F) of FIG. 4, $\Delta E'$ is the output signal produced by the Doppler shift $fr' - ft$ that is detected by the second transmitting transducer 11 and the second receiving transducer 10, and $\Delta E_{N'}$ is the effective value of a ripple component that is produced as a result of frequency change that is caused by the serpentine motion of the solid particle 13. When fluid of uniform composition flows through an ordinary pipe, the distribution of flow velocity is symmetrical with respect to the central axis 5, so the absolute values of $\Delta E$ and $\Delta E'$ are substantially equal to each other, and so are the absolute values of $\Delta E_N$ and $\Delta E'_N$.

Figure 4:
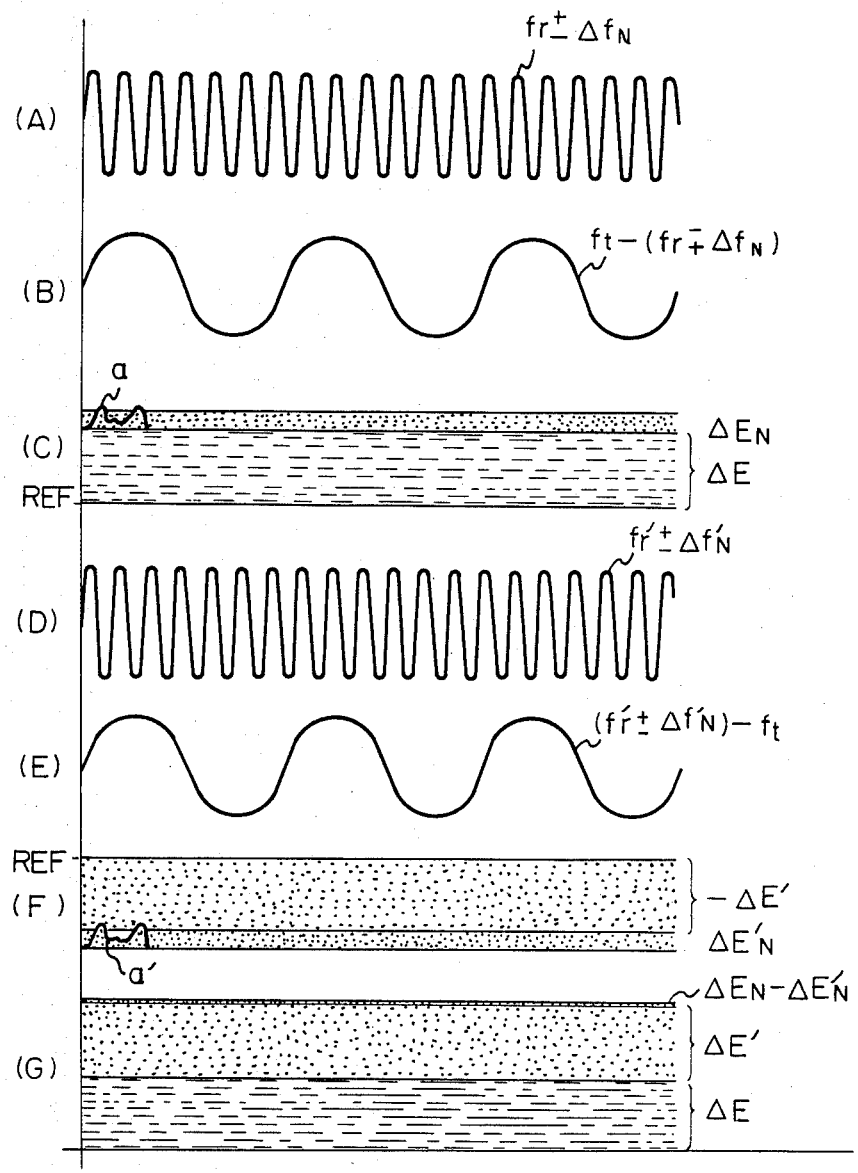
FIG. 4 is a time chart illustrating principal waves in the embodiment in FIG. 3 and in the reflection mode signal processing section D in FIG. 6.

An output signal as shown in curve (C) of FIG. 4 from the first frequency discriminator 130 and an output signal as shown in curve (F) of FIG. 4 from the second frequency discriminator 130' are supplied to a differential amplifier 170 which subtracts the latter signal from the former to supply the corrector 140 with an output signal as shown in curve (G) of FIG. 4. The first and second receiving transducers 8, 10 are so positioned that they are subjected to the Doppler shifts in opposite directions because of the movement of the solid particle 12 and 13 in the direction of the central axis 5. Hence, as shown at $\Delta E$ in curve (C) of FIG. 4, and at $-\Delta E'$ in curve (F) of FIG. 4, output signals having opposite polarity are produced as a result of the movement of the solid particles 12, 13 in the direction of the central axis at different speeds, and they change in opposite directions in response to a change in the speed. Consequently, an output signal $\Delta E + \Delta E'$ as shown in curve (G) of FIG. 4 is produced as the signal for the difference between the two signals, and the resulting voltage output is almost twice that produced from the circuit using only the first receiving transducer 8.

To eliminate a noise component resulting from the serpentine motion of the solid particles 12, 13 symmetrical with respect to the central axis 5, the first receiving transducer 8 and the second receiving transducer 10 are so arranged that they are subjected to the Doppler shift in the same direction. In addition, the serpentine motion of the solid particle 12 and that of the solid particle 13 contained in the fluid 1 at a position close to the wall of the pipe 2 that is opposite to the wall close to which the particle 12 is present have many velocity components symmetrical with respect to the central axis 5 and are related to each other. As a result, when the ripple component of the output signal from the first frequency discriminator 130 increases as shown, for example, at (a) in curve (C) of FIG. 4, there is a great possibility that the output signal from the second frequency discriminator 130' also changes in the same way as shown at (a') in curve (F) of FIG. 4. Consequently, in the signal shown in curve (G) of FIG. 4 that indicates the difference between the two signals, the ripple components $\Delta E_N$ and $\Delta E_{N'}$, i.e. the noise components in frequency range due to the serpentine motion of the solid particles 12, 13 are offset.

The phenomena described above are formulated as follows: When a vector component of the velocity of the solid particle 12 in the direction of the central axis 5 and a vector component of the velocity of the solid particle 13 in the same direction are $V_1$ and $V_2$, respectively, the following relations are established: $V_1 = u_1 + \Delta u_1$ and $V_2 = u_2 - \Delta u_2$, wherein $u_1$ and $u_2$ are vector components of the average velocities of the solid particles 12, 13, respectively, in the direction of the central axis 5, and $\Delta u_1$ and $\Delta u_2$ are vector components of the change in the velocities of the solid particles 12, 13, respectively, due to the motion of the particles.

As already known, the relation between the Doppler shift and the velocity of an object to be measured is represented by the following formula:

$$\Delta f = ft - fr = \frac{2ftV}{C} \cos\alpha$$

wherein $\Delta f$ = the Doppler shift, ft = the frequency of the signal transmitted, fr = the frequency of the signal received, C = the propagation speed of the ultrasonic signal for V = 0, V = the velocity of the object to be measured, and $\alpha$ = the angle formed between the direction in which the signal transmitted or received propagates and the direction in which the object to be measured moves.

Therefore, the Doppler shift $\Delta f_1$ detected by the first transmitting transducer 6 and the first receiving transmitter 8 in FIG. 3 is represented as follows:

$$\Delta f_1 = ft - (fr \mp \Delta f_N) = \frac{2ft}{C}(u_1 + \Delta u_1)\cos\alpha$$

Likewise, the Doppler shift detected by the second transmitting transducer 11 and the second receiving transducer 10 is represented by:

$$\Delta f_2 = (fr' \pm \Delta f_{N'}) - ft = -\frac{2ft}{C}(u_2 - \Delta u_2)\cos\alpha$$

The difference between the two Doppler shifts obtained by the differential amplifier 170 is:

$$\Delta f_1 - \Delta f_2 = \{(ft - fr) + (ft - fr')\} + (\Delta f_N - \Delta f_{N'}) =$$
$$\frac{2ft}{C}(u_1 + u_2)\cos\alpha + \frac{2ft}{C}(\Delta u_1 - \Delta u_2)\cos\alpha$$

wherein the first term in the right side represents the Doppler shift based on the average velocity of the particles 12, 13, and the second term represents the Doppler shift due to the serpentine motion of the particles. Therefore, when the solid particles 12, 13 move along serpentine courses in complete symmetry with respect to the axis 5, $\Delta u_1$ is equal to $\Delta u_2$ in the formula above, so that the second term in the right side is zero, indicating that the noise component in frequency range is completely offset.

Figure 5:
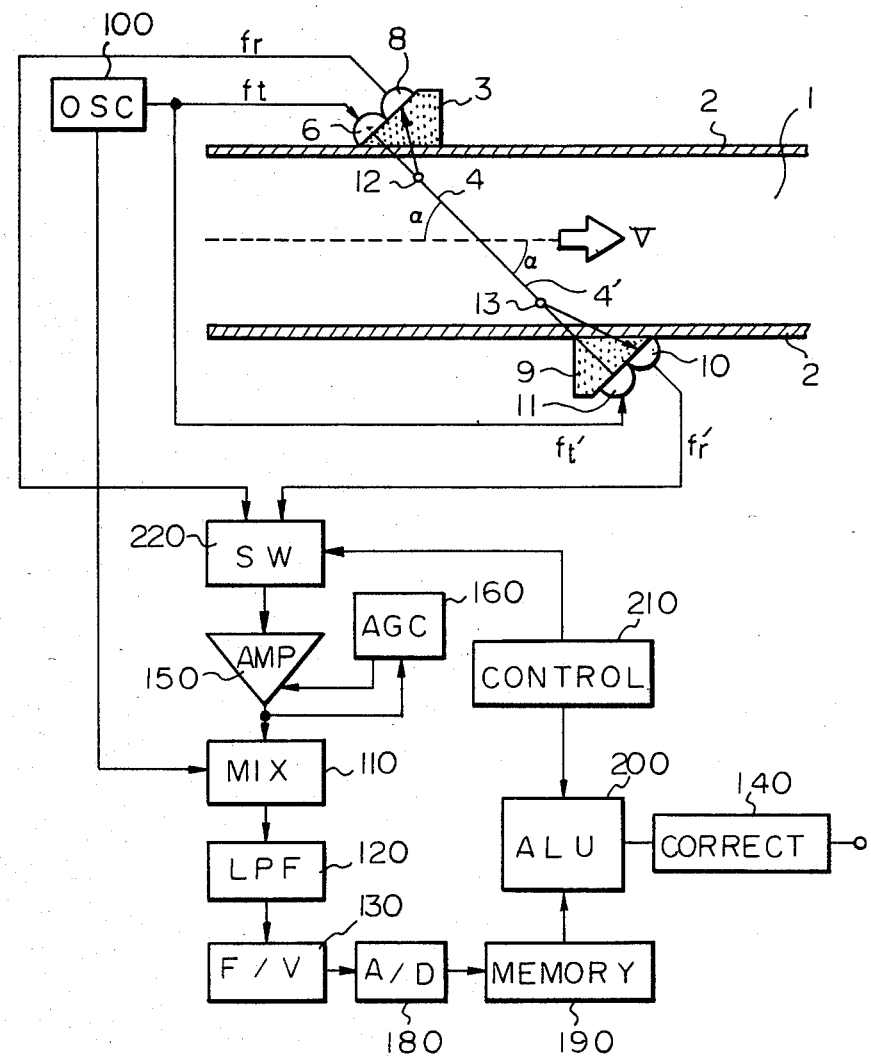
FIG. 5 is a block diagram of another embodiment of this invention.

If the average velocities of the solid particles 12, 13 are equal in the direction of the central axis 5, $u_1$ is equal to $u_2$ in the formula above, so that the first term in the right side is $(4ft/C)u_1 \cos\alpha$, indicating that the Doppler shift due to the average velocities of the solid particles in the direction of the central axis 5 is doubled. FIG. 5 is a block diagram showing the arrangement of circuit components according to still another embodiment of this invention, wherein like numerals identify like components. When a control signal from a control unit 210 actuates a switching unit 220 for supplying an electrical signal from the first receiving transducer 8 to the amplifier 150, the frequency discriminator 130 operates in the same manner as described in connection with the second embodiment by reference to FIG. 3 to provide an output signal as shown in curve (C) of FIG. 4. An analog-digital converter 180 converts the output signal into a digital signal which is supplied to a memory 190.

Then, the control unit 210 makes another supply of a control signal which actuates the switch unit 220 for supplying an electrical signal from the second receiving transducer 10 to the amplifier 150. In the same manner as described above, the frequency discriminator 130 supplies the analog-digital converter 180 with an output signal as shown in curve (F) of FIG. 4 which is converted by the converter 180 to a digital signal for storage in the memory 190. Then, the control unit 210 sends a command to an arithmetic and logic unit 200 which reads from the memory 190 the digital signal that corresponds to the output signal from the first receiving transducer 8 and the digital signal that corresponds to the output signal from the second receiving transducer 10, and subtracts the latter signal from the former. Such digital arithmetic operation provides a digital signal that corresponds to the output signal shown in curve (G) of FIG. 4. The corrector 140 receives the digital signal from the arithmetic unit 200 and makes necessary corrections, i.e. a correction based on the distribution of flow velocity (distance of travel/unit time) particle velocity, and a correction with a constant providing an indication of flow rate (volume of flow/unit time).

One advantage of the embodiment shown in FIG. 5 is that it need use only one amplifier 150, one mixer 110 and one frequency discriminator 130 since these units are used on a time-shared basis (in comparison, two units of each component are necessary in the embodiment of FIG. 3).

In the second and third embodiments of this invention (FIGS. 3 and 4), the axis 4' of the ultrasonic signal beam from the second transmitting transducer 11 is positioned on the extension of the axis 4 of the ultrasonic signal beam from the first transmitting transducer 6. However the second transmitting and receiving transducers 11, 10 need not be so positioned as to satisfy this relation. Alternatively the first and second transmitting transducers 6, 11 may be arranged on the line that crosses the central axis 5 at a right angle, with the fluid 1 being interposed between the two. In other words, the two transmitting transducers are disposed on opposite sides of the pipe or conduit 2. One advantage of this arrangement is that the positions at which the ultrasonic signal is reflected from the solid particles 12, 13 are symmetrical with respect to the central axis 5, and in consequence, most reliable offsetting of the frequency changes due to the serpentine motion of the solid particles 12, 13 is achieved.

However, it should be noted that the space relationship between the two transducer units (one comprises the transmitter 6 and receiver 8, while the other unit comprises the transmitter 11 and the receiver 10) as illustrated in FIG. 3 also produces a substantial noise cancelling effect, in cooperation with the signal emphasizing processing as given in the differential amplifier 170. Briefly, this space relationship is also a noise cancellable arrangement unless the distance between the two transducer units is far longer than the radius of the pipe 2 (d>>r).

In the second and third embodiments, the angle at which the axis 4' of the ultrasonic signal beam from the second transmitter transducer 11 crosses the central axis 5 is equal to the angle at which the axis 4 of the ultrasonic signal beam from the first transmitter transducer 6 crosses the central axis 5, but the two angles may differ from each other and even in such a case, by adjusting the gain of the differential amplifier 170 with respect to individual input signals, ripple component produced by a change in frequency can also be offset satisfactorily and the output signal that is produced by the Doppler shift due to the movement of the solid particles 12, 13 in the direction of the central axis 5 is substantially twice the output produced from the embodiment of FIG. 1.

Figure 6B:
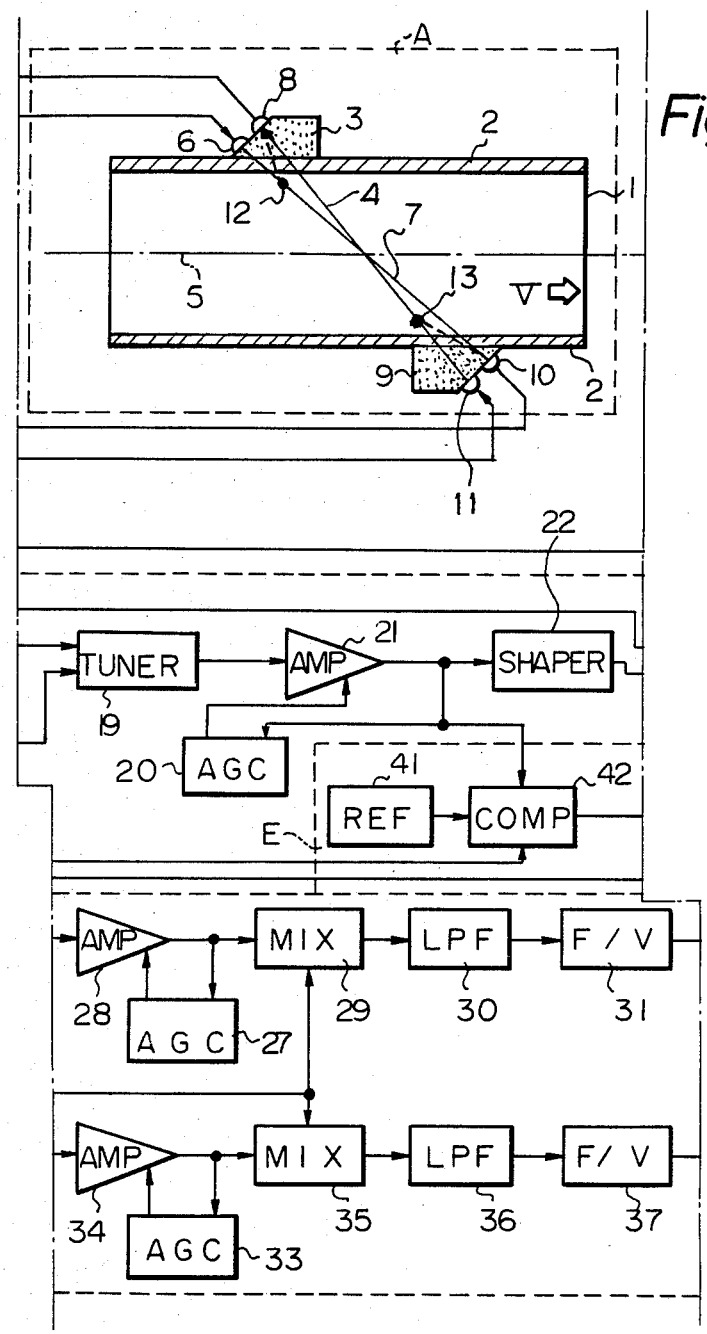
Figure 6C:
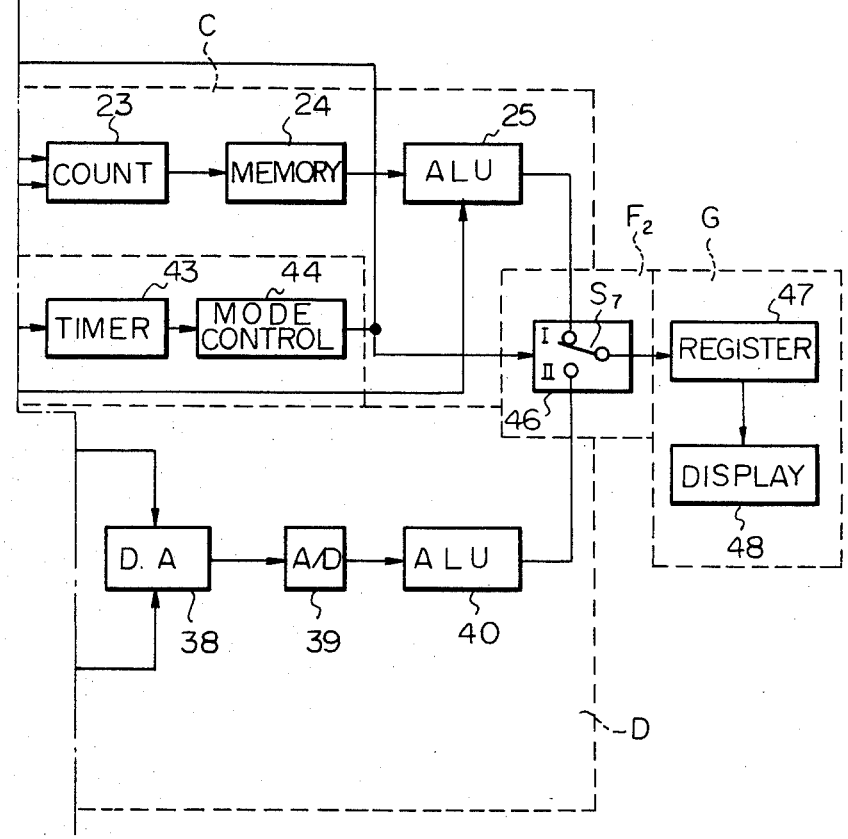

Referring now to FIGS. 6A, 6B and 6C there is shown yet another embodiment of this invention. The illustrated embodiment basically comprises an ultrasonic transmitter and receiver section designated A, an oscillator section designated B, a transmission mode signal processing section designated C, a reflection mode signal processing section designated D, a mode switching control section designated E, mode switching sections designated $F_1$ and $F_2$, and an output section designated G.

The ultrasonic signal transmission and reflection section A comprises a wedge shaped plastic member mounted on the wall 2 of the pipe in which the tested fluid 1 flows in the direction generally designated by an arrow V, an upstream-positioned transducer 6 secured on the inclined portion of the wedge 3 for transmitting ultrasonic signals downstream in the fluid medium along the path of signal propagation 4 which intersects the axis of the pipe 5 or the direction of the fluid flow with a predetermined angle α less than 90 degrees, an upstream-positioned receiving transducer 8 also secured on the inclined portion of the wedge 3 and disposed adjacent to the transducer 6 and in alignment with the path of travel 7 generally parallel and adjacent to the path 4, a wedge shaped plastic member 9 mounted on the pipe wall 2 and disposed in opposed relationship to the plastic wedge 3, a downstream-positioned receiving transducer 10 secured on the inclined portion of the wedge 9 the path of travel 7, and a downstream-positioned transmitting transducer 11 disposed adjacent to the downstream-positioned receiving transducer 10 for transmitting ultrasonic waves upstream along the path of propagation 7. Solids or air bubbles are schematically exemplified by dots designated 12 and 13.

Oscillator section B comprises an oscillator 14 for generating electric signals which are converted by the transmitting transducers 6 and 11 to ultrasonic signals having a frequency ranging preferably from 500 KHz to 1 MHz, and a modulator 15 operatively connected between the oscillator 14 and the transmitting transducers 6 and 11 for amplitude-modulating the sinusoidal carrier waves from the oscillator 14 in accordance with pulses or modulating signals from a pulse generator 16.

Transmission mode signal processing section C comprises an ultrasonic beam direction switching circuit 17 including switches $S_1$ and $S_2$ for switching the direction of the ultrasonic beam between upstream and downstream, a controller 18 connected to the direction switching circuit 17 and the modulator 15 for controlling the direction switching circuit 17, a tuner 19 connected to the movable contact of the switch or relay $S_2$, an amplifier 21 gain-controlled by an automatic gain control element 20, a pulse shaper 22 connected to the gain controlled amplifier 21, a time interval counter 23 connected to the pulse shaper 22 and the modulator 15 for measuring the time of ultrasonic propagation, a memory 24 connected to the counter 23, and an ALU 25 connected to the memory 24 and the beam direction switching circuit 18.

The reflection mode signal processing section D comprises a first tuner of the staggered type 26, an amplifier 28 connected to the tuner 26 and gain-controlled by an automatic gain controlling element 27, a first mixer 29 connected to the gain-controlled amplifier 28 and the oscillator 14 for producing heat signals, a first low-pass filter 30 connected to the mixer 29, a first frequency-to-voltage converter or frequency discriminator 31 connected to the low-pass filter 30. This constitutes a first channel of the processing section D for detecting a first type Doppler shift (decrease in frequency) in the reflection mode. The reflection mode signal processing section D also comprises a second type Doppler shift (increase in frequency) detecting channel including a second tuner of the staggered type 32 which is connected to an amplifier 34 having an automatic gain control element 33 which amplifier is connected to a second mixer 35 which is connected to a second low-pass filter 36 which is connected to a second frequency discriminator 37. The outputs from the first and second channels are connected to a differential amplifier 38 which is connected to an analog-to-digital converter 39 which is connected to an ALU 40.

A mode switching control section E comprises an adjustable reference voltage circuit 41 for supplying the reference voltage to a comparator 42 which also receives the signal from the amplifier 21. The output of the comparator 42 is fed to a timer 43 which introduces a predetermined delay or dead time in response and is connected to a mode switching control circuit 44.

A first mode switching section $F_1$ comprises a switching circuit 45 including switches $S_3$ through $S_6$. A second mode switching section $F_2$ comprises a switching circuit 46 including a switch $S_7$.

An output or display section G comprises a display register 47 connected to the movable contact of the switch $S_7$ in the mode switching circuit 46, and a display 48 connected to the register 47.

The output of the mode switching control section E is connected to the first and second mode switching circuits 45 and 46, the beam direction controller 18, pulse generator 16, and the comparator 42.

A movable contact of the switch $S_1$ is connected to the modulator 15, beam direction switching controller 18, a stationary or fixed contact II of the switch $S_3$ and a stationary contact II of the switch $S_4$. A stationary contact a of the switch $S_1$ is connected to a stationary contact I of the switch $S_4$. Another stationary contact b of the switch $S_1$ is connected to a stationary contact I of the switch $S_3$. A movable contact of the switch $S_2$ is connected to the tuner 19. A stationary contact a of the switch $S_2$ is connected to a stationary contact I of the switch $S_6$. Another stationary contact b of the switch $S_2$ is connected to a stationary contact I of the switch $S_5$. A stationary contact II of the switch $S_5$ is connected to the second tuner 32. A stationary contact II of the switch $S_6$ is connected to the first tuner 26 and the tuner 19.

The movable contacts of the switches $S_3$, $S_4$, $S_5$ and $S_6$ are connected to the transmitting transducer 6, the transmitting transducer 11, the receiving transducer 10 and the receiving transducer 8, respectively.

A stationary contact I of the switch $S_7$ is connected to the processor 25 in the transmission mode signal processing section C while another stationary contact II of the same switch is connected to the processor 40 in the reflection mode signal processing section D. A movable contact of the switch $S_7$ is connected to the display controller 47.

Figure 7:
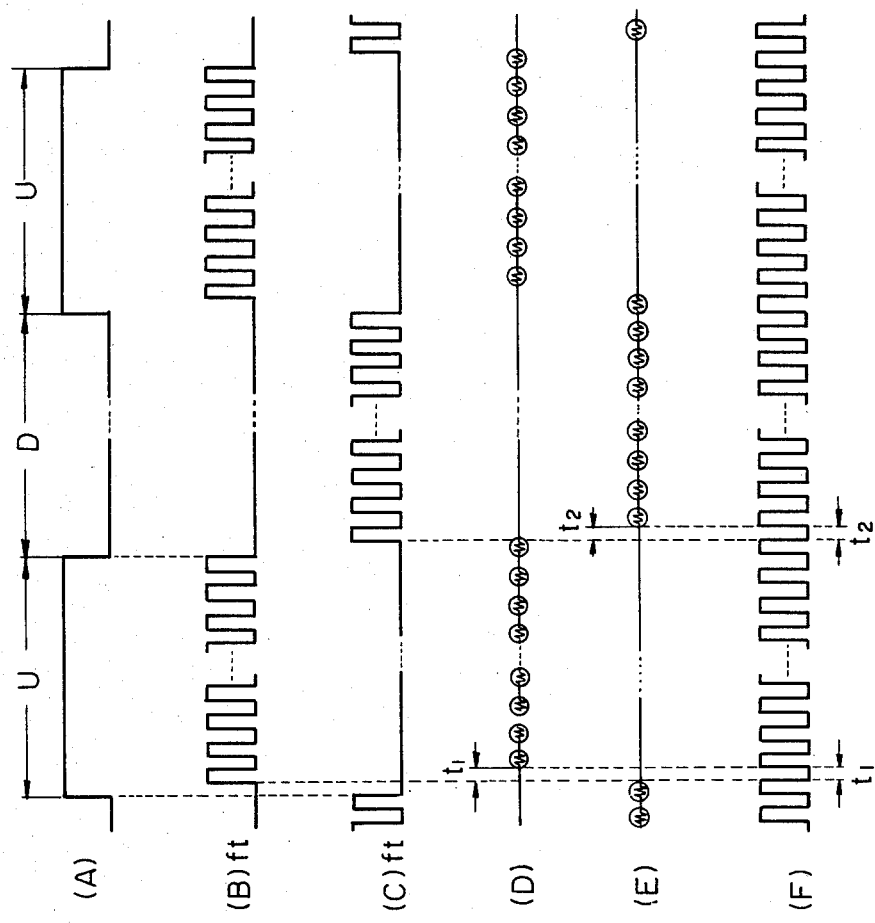
FIG. 7 is a time chart illustrating principal waves in the transmission mode signal processing section C in FIG. 1.

The construction of this embodiment and its internal connections have been described. The operation of the embodiment will be described in conjunction with FIGS. 4 and 7 illustrating the principal waveforms in the transmiwsion mode signal processing section C and the reflection mode signal processing section D, respectively.

The mode of the flow meter system is controlled or selected by the mode switching control section E. For clear or less polluted fluid, the mode switching control section E generates a first mode switching signal at the output of the mode switching control circuit 44. This mode switching signal is fed to the mode switching sections $F_1$ and $F_2$ in which the switches $S_3$ through $S_6$ respond to connect or bridge their respective movable contacts to the stationary contacts I, and maintain this position as far as the system is operated in the transmission mode. The first mode switching signal enables the beam direction controller 18 to produce a control signal as shown in curve (A) of FIG. 7 switched periodically between high and low levels. For high level periods Us′, the switches $S_1$ and $S_2$ in the beam direction switching circuit 17 are energized and placed in an upstream position wherein the respective movable contacts are connected to the stationary contacts a whereas for periods Ds′ during which the control signal is low, the switches $S_1$ and $S_2$ are deenergized and placed in the downstream position wherein the respective movable contacts are connected to the stationary contacts b.

The first mode switching signal from the mode switching control section E further enables the pulse generator 16 in the oscillator section B to produce pulses or modulating waves in order to perform the modulation in the oscillator section. Preferably, the modulating waves are periodic rectangular pulses having a pulse width in the range of 1 microsecond through 5 milliseconds and a pulse repetition rate in the range of 20 through 500 PPS. A carrier or sinusoidal wave generated by the oscillator 14 and having a relatively high frequency in the order of 500 KHz through 1 MHz is amplitude-modulated by the modulator 15 in accordance with the pulses from the pulse generator 16. In this manner, the oscillator section B produces a modulated or intermittent (pulsed) signal as far as the system is operated in the transmission mode.

The modulated signal is fed to the beam direction switching circuit 17 which is now periodically switched between upstream and downstream positions by the controller 18. Curve (B) of FIG. 7 illustrates an envelope of the modulated signal appearing at the stationary contact a of the switch $S_1$ while curve (C) of FIG. 7 illustrates an envelope of the modulated signal appearing at the other stationary contact b of the same switch $S_1$.

In the upstream position, the modulated signal is passed through the contact a of the switch $S_1$ and through the movable contact of $S_4$ in the mode switching section $F_1$, and fed to the transmitting transducer 11. The transducer 11 converts the electric signal to an ultrasonic signal and transmits it upstream to the tested fluid 1 along the line of travel 7 in alignment with the receiving transducer 8. Accordingly, part of the beam-like ultrasonic signal is detected and converted by the transducer 8 into a sinusoidal, intermittent (modulated) electric signal as illustrated in FIG. 7. The intermittent wave is then passed through the stationary contact I of the switch $S_6$ and the stationary contact a of the switch $S_2$ to the tuner 19. The tuner rejects the noise component in the received, intermittent wave and supplies the tuned wave to the amplifier 21 which amplifies it to a level appropriate for subsequent signal processing and supplies the amplified signal to the pulse shaper 22. In this respect the amplifier 21 is automatically gain-controlled by the AGC element 20 so that the output signal of the amplifier is maintained at a sufficient level or amplitude regardless of whether the signal from the tuner 19 temporarily decreases in amplitude when air bubbles or solids in the fluid momentarily come into path of travel of the ultrasonic beam. The pulse shaper 22 may include a Schmitt trigger circuit which is triggered to produce a rectangular pulse in response to each leading edge of the intermittent signal. Curve (F) of FIG. 7 illustrates a rectangular pulse train produced by the pulse shaper 22.

It is noted from curve (B) of FIG. 7 and curve (F) of FIG. 7 that the time difference between one of the pulses in curve (B) of FIG. 7 and the corresponding pulse in curve (C) of FIG. 7, as exemplified by a time $t_1$, represents the time of travel of the ultrasonic signal from the transmitting transducer 11 upstream through the fluid medium 1 along the path 7 to the receiving transducer 8.

Of course, the time difference $t_1$ includes time lag in response in the electric circuit elements such as the transducers 11 and 8, tuner 19, amplifier 21 and pulse shaper 22. However, the time lag in these circuit elements is generally constant so that appropriate subtractive correction can easily be made by the ALU 25.

The time counter 23 includes a high frequency clock and starts counting the clock pulses each time it receives a pulse from the modulator 15 and continues counting until the corresponding pulse from the pulse shaper 22 is received. In this manner, the time difference as indicated by $t_1$ is temporarily stored in the counter 23. Immediately after the counter stops counting it transfers the count in a digital form to the memory 24. The counter 23 repeats this operation, i.e. counts the next time difference between a second pulse applied to the transducer 11 and the corresponding pulse from the pulse shaper 22 and transfers the count to the memory 24.

The memory stores these counts in order as they are successively transferred from the counter 23.

The pulse train from the modulator 15 is also fed to the beam direction controller 18 which has already been enabled by the first mode switching signal from the mode switching controller 44. The beam direction controller 18, when enabled, counts the pulses from the modulator 15. When the count reaches a predetermined value resulting from the predetermined elapse of time defining the end of an upstream (or downstream) beam direction period, the beam direction switching controller 18 produces and supplies a signal as indicated by high-to-low level transition in curve (A) of FIG. 7 to the processor 25. Responsively, the processor 25 rapidly fetches from the memory 24 a group of time differences $t_1$ stored in a digitally coded form therein, and calculates the average $\overline{E_1}$ thereof. It is noted that the average value represents the average time of ultrasonic propagation in the downstream direction through the fluid medium 1 from the transducer 11 to the transducer 8, as derived from data during the predetermined period (U period in FIG. 7) which is set in the beam direction switching controller 18.

The above mentioned signal from the beam direction switching controller 18 is also fed to the beam direction switching circuit 17 which, in turn, switches the switches $S_1$ and $S_2$ to move and connect the respective movable contacts to the stationary contacts b, thus establishing a downstream direction of beam propagation.

Accordingly, the pulses from the modulator 15 (in fact, the sinusoidal electric waves as amplitude-modulated by rectangular pulses from the pulse generator (16) are now fed through the stationary contact b of the switch $S_1$ and the stationary contact I of the switch $S_3$ to the transmitting transducer 6 from which the converted ultrasonic waves are propagated and travel downstream in the fluid medium 1 along the path 4 down to the receiving transducer 10. The output signal of the transducer 10 is fed through the stationary contact I of the switch $S_5$ and the stationary contact b of the switch $S_2$ to the tuner 19 after which the signal is processed in a similar manner as described. The time counter 23 counts the time difference which however, in this case represents the time of the ultrasonic propagation in the downstream rather than upstream direction, as required as the ultrasonic signal travels downstream along the path 4 from the transmitting transducer 6 to the receiving transducer 10. An example of this type time difference is indicated by $t_2$ curve (F) of FIG. 7, as well as curve (E) of FIG. 7 in comparison with curve (C) of FIG. 7 illustrating the envelope of the signal as applied to the transmitting transducer 6.

The memory 24 stores the downstream propagation data by successively receiving the counts from the counter 23. The beam direction controller 18 detects the predetermined elapsed time as described to produce a beam direction switching signal as indicated by low-to-high level transition of wave in curve (A) of FIG. 7. The signal controls the beam switching circuit to switch back into the upstream position so that the movable contacts of the switches $S_1$ and $S_2$ depart from the first stationary contacts b and engage the second stationary contacts a.

The signal from the beam direction controller 18 is also fed to the processor 25 which, thereupon, reads out the $t_2$, data i.e. a group of digital codes and calculate the average $\overline{t_2}$ thereof which is then subtracted from the average $\overline{t_1}$ previously calculated. In this manner, the processor 25 produces an average velocity of flow of the tested fluid 1 over a period or cycle half of which is the predetermined time in the beam direction controller 18.

Preferably, the processor includes a parallel-to-serial converter from which the digital data representing the average velocity of flow of the tested fluid are serially or bit by bit fed through the stationary contact I of the switch $S_7$ to a serial-to-parallel converter in the display register 47, which, thereupon controls the display 48 to visually display the flow velocity of the tested fluid. The serial transfer of data between the processor 25 and the display register or controller 47 minimizes the number of contacts of the switch $S_7$ in the mode switching section $F_2$ as well as the number of transmission lines connected therebetween, thus facilitating a remote display.

The processor 25 may preferably include flow rate (volume of flow/unit time) measuring function which calculates the flow rate by multiplying the velocity of flow (length/unit time) by the sectional area across which the tested fluid passes, thus permitting the display 48 to indicate a direct representation of the volume of flow per unit time.

The operation in the transmission mode has been described. A description of the switching operation into the reflection mode and the operation in the reflection mode will follow.

As the tested fluid 1 becomes more polluted or cloudier, it introduces a greater loss or attenuation to the ultrasonic waves traveling therethrough along the paths 4 and 7 thereby decreasing the amplitude of the received signal. When the input signal to the amplifier falls down to an amplitude or level sufficient to nullify the feed-back action of the AGC element 20 which, for less-polluted fluid, normally maintains the output signal level of the amplifier 21, then the output signal of amplifier 21 decreases. As shown in FIG. 6, the output pulse signal of amplifier 21 is monitored by the comparator 42 in the mode switching control section E which samples and holds the peak of each pulse thereof and compares it with the reference voltage from the adjustable voltage generator 41. Upon detection, the comparator 42 produces and supplies a signal to the timer 43 (dead time introducer). If the signal from the comparator 42 exists or continues beyond the predetermined time interval selected in the timer 43, the timer signals the mode switching control circuit 44 which, thereupon generates a mode switching control signal whereby the system is switched into the reflection mode.

The timer 43 introduces a dead time and functions to prevent the frequent occurrence of switching between the transmission and reflection modes resulting from temporary variations in the level of pollution in the tested fluid 1.

The reference voltage produced by the voltage generator 41 may be manually adjustable so that a desired switching level of pollution at which the mode change occurs is selected.

The mode switching signal from the mode switching control circuit 44 is fed to the mode switching circuits 45 and 46 in which the movable contacts of the switches $S_3$ through $S_6$ and $S_7$ disengage from the first stationary contacts I and are connected to the second stationary contacts II.

The mode switching signal is further fed to the beam direction switching control circuit 18 and the pulse generator 16. Responsively, the beam direction switching circuit 17 is placed into a disabled condition. The pulse generator 16 stops the generation of pulses and instead supplies a high or "1" state level to the modulator 15. As a result, the carrier from the oscillator 14 is no longer modulated.

In response to the mode switching signal, the comparator 42 also stops the "sample and hold" function as described. In this manner, the system is switched into the reflection mode from the transmission mode. It is noted here that the beam direction switching circuit 17 including the switches $S_1$ and $S_2$ does not participate in the operation of the system during the reflection mode.

In the reflection mode, the sinusoidal signal or carrier from the oscillator 14 is not modulated by pulses, and is fed, as a "continuous wave", to both of the transmitting transducers 6 and 11 passing through the second stationary contact II of the switch $S_3$ and the second stationary contact II of the switch $S_4$, respectively.

Accordingly, the transducer 6 transmits a continuous ultrasonic signal through the tested fluid 1 along the path 4. The fluid 1 is now a relatively polluted one containing a considerable number of air bubbles and/or solids as generally indicated by 12 and 13 in FIG. 6. The continuous ultrasonic signal from the transducer 6 is thus scattered by such particles adjacent to the wall of the pipe 2 as they are crossing the path of ultrasonic propagation 4. Part of the scattered waves or reflected waves, then advance along a path 7 generally parallel and adjacent to path 4 and reaches the receiving transducer 8 disposed adjacent to the transmitting transducer 6. In this respect, the receiving transducer 8 is preferably placed slightly downstream (rather than upstream) relative to the transmitting transducer 6 in order to receive a maximum fraction of the scattered waves as a reflection mode signal because the path of the ultrasonic waves is shifted downstream by the flow of the liquid.

Before proceeding with a description of the operation of the embodiment it should be noted that the ultrasonic signal transmitted from the transmitter is a beam or bundle of ultrasonic waves comprising a number of substantially collimated, or parallel waves with very low divergence. Accordingly, the parallel waves individually impinge upon a plurality of particles (solids and/or air bubbles) in the normal fluid. However, unless otherwise specified, the description on the reflection mode has dealt and will deal with a simplified case wherein the waves are reflected by a single particle, in order to a facilitate the understanding of one aspect of this invention. Also it should be noted that the transmitter 11 is disposed very close to the receiver 10.

The angle determined by the path of travel 7 extending between the transmitter and the reflecting particle 13 and the path of backward travel from that particle to the receiver 10 is very small and always has a substantial constant, small degree of angle irrespective of the position of that particle relative to the transducers 10 and 11. This is also applied to another transducer set (6 and 8).

Turning back to the operation of the embodiment, the receiving transducer 8 observes a first type Doppler shift (decrease in frequency) in the ultrasonic wave incident thereupon.

The received ultrasonic signal is converted by the receiving transducer 8 to an electric signal as exemplified in curve (A) of FIG. 4.

In a similar manner, the second transmitting transducer 11 transmits a continuous ultrasonic signal along the path 7. The signal is similarly scattered by the air bubbles and/or solids 13 passing near the wall of pipe 2. Part of the scattered ultrasonic wave falls upon the receiving transducer 10 disposed adjacent to the transmitting transducer 11.

The transducer 10 thereupon converts the incident ultrasonic signal to an electric signal as schematically shown in curve (D) of FIG. 4. This signal assumes a second type Doppler shift, i.e. an increased frequency relative to the frequency of the sinusoidal signal as applied to the transmitting transducer 11 in accordance with the velocity of the flow of the fluid (the velocity of the particle).

The first type Doppler shifted sinusoidal signal from the transducer 8 and second type Doppler shifted sinusoidal signal from the transducer 10 are fed through the respective stationary contacts II of the switches $S_6$ and $S_5$ to the first and second tuners 26 and 32, respectively.

The tuners 26 and 32, and the amplifiers 28 and 34 used in the reflection mode signal processing section D operate on the received signal in a manner similar to that of the tuner 19 and the amplifier 21 in the transmission mode signal processing section C.

After being tuned or filtered and amplified, the Doppler shifted signal of the first type is fed to the mixer 29 in which it is mixed with the sinusoidal signal from the carrier oscillator 14 to produce beats having two frequency components, i.e. the difference between the input signal frequencies, and the addition thereof. The low-pass filter 30 rejects the addition and only permits the difference type beat signal as schematically shown in curve (B) of FIG. 4 to pass therethrough.

In a similar manner, the second type Doppler shifted signal is mixed by the mixer 35 with the sinusoidal reference signal from the oscillator 14 and then filtered by the low-pass filter 36. The filtered beat signal is schematically shown in curve (E) of FIG. 4.

The frequency-to-voltage converter 31 receives the beat signal from the low-pass filter 30 and converts it to a voltage in proportion to the input frequency.

The voltage signal is schematically shown in curve (C) of FIG. 4. Similarly, the second frequency-to-voltage converter 37 receives the second beat signal from the low-pass filter 36 and converts it to a voltage in proportion to the input signal frequency. It is preferred, however, that the voltage signal outputted from the second converter 37 be in polarity opposite to the voltage signal from the first converter 31. For example, the first converter 31 outputs a positive voltage while the second converter 37 outputs a negative voltage although the absolute value of either output signal voltage is in proportion to the value of the input signal frequency. The voltage signal from the second converter 37 is schematically shown in curve (F) of FIG. 4.

Description now turns to an analysis of the motion of the flowing fluid and particles contained and entrained therein and the influence of the noise velocity component on the flow meter system.

In general, solids and air bubbles entrained in the fluid flowing in a pipe moves at a velocity vector consisting of a first velocity component parallel to the axis of the pipe or the general flow of the liquid and a second velocity component normal thereto. The first component provides a signal with the Doppler shift type flow measurement whereas the second component introduces a noise (or error) thereto.

Assuming, for example that the solid 12 as shown in FIG. 6B and a body of fluid between that solid and the wall of pipe 2 adjacent to the ultrasonic receiver 8 moves inwardly toward the axis 5, such a second velocity vector imparts a second-type Doppler shift (increase in frequency) to the receiver 8 because this vector includes a vector component in the same direction as the direction of propagation of the reflection mode ultrasonic signal from solid or sound source 12 to the receiver 8. On the other hand, an outward movement of the solid 12 introduces a first-type Doppler shift or decrease in frequency to the observing receiver 8.

The second velocity component is very time dependent. In other words, at a particular time an inward velocity vector component is imparted to the solid 12 and, at another time an outward vector component is provided thereto.

Owing to the time varying characteristics of the second velocity component normal to the axis 5 or the general direction of the flow of fluid, the signals received by the receivers 8 and 10 fluctuate in frequency with respect to time. The frequency of the received signal at the receiver 8 is indicated by $fr \pm \Delta f_N$ in curve (A) of FIG. 4. The term fr is the center frequency determined by the time-independent or stationary velocity component of the velocity vector of the solid 12, i.e. signal component, while the second term $\Delta f_N$ is an error due to the time-varying velocity component i.e. noise component.

Similarly, the frequency of the received signal at the receiver 10 is indicated by $fr' \pm \Delta f'_N$ in curve (D) of FIG. 4. Accordingly, the output voltage of the frequency-to-voltage converter 31 also comprises the stable voltage component E (curve (C) of FIG. 4) representing the signal component of the Doppler shift, and the fluctuating component $\Delta E_N$ representing the noise component of the Doppler shift due to the second velocity vector component normal to the axis of fluid flow. Similarly, the second frequency-to-voltage converter 37 outputs a voltage consisting of the stable component E' and fluctuating component $\Delta E'_N$ as shown in FIG. 4(F).

It is found that the above mentioned second velocity components imparted to solids in the fluid because of random aspect distributed in an approximately symmetrical pattern with respect to the center axis of flow. In FIG. 6B, the solid or air bubble 12 is located at a point (in fact, passes by this point at the reflection time) which is almost symmetrical with respect to the location of the solid 13 with respect to the axis 5. The above law of symmetry of the second velocity or noise component holds that the second velocity component of the solid 12 and that of the solid 13 are opposite in direction and nearly the same in size. Correspondingly, the noise component of the Doppler shift $\Delta f_N$ due to the second or noise velocity component of the solid 12, as evidenced in the receiver 8 is of the same type and is nearly the same in amount as the noise component of the Doppler shift $\Delta f_N'$ due to the second velocity component of the solid 13, as evidenced in the receiver 10. If statistically considered, $\overline{\Delta f_N} = \overline{\Delta f_N'} = 0$, when particles are infinitely many.

In accordance with these principals, the differential amplifier 38 subtracts the Doppler shift in the form of voltage $(-\Delta E' + \Delta E_N')$ in the second channel from the Doppler shift in the form of voltage $(\Delta E + \Delta E_N)$ in the first channel thereby to emphasize or double the signal component and cancel or offset the noise component as schematically shown in curve (G) of FIG. 4, thus improving signal-to-noise ratio. A curve a in curve (G) of FIG. 4 more specifically illustrates the voltage signal from the first F/V converter while a sub-curve a' in curve (C) of FIG. 4 more specifically illustrates the voltage signal from the second F/V converter. After subtracting the noise component there is almost no noise.

The output signal of the differential amplifier has a high-signal-to-low-noise ratio and, is then fed to an analog-to-digital converter from which the corresponding digital signal is fed to the ALU 40.

The ALU 40 similar to the transmission mode signal ALU 25 corrects the signal and obtains data representing with high accuracy the velocity of flow (distance/unit time) and/or rate of flow (volume of flow/unit time) of the tested fluid and transfers it serially through the second contact II of the switch S7 to the display control 47 which operates in the same manner as in the transmission mode.

The description will now turn to the operation for automatically switching from the reflection mode back to the transmission mode.

When the system is operated in the reflection mode, the output signal of the transducer 8 that is fed to the first tuner 26 is also supplied to the tuner 19. Accordingly, the mode switching control section E is operated in the same manner as in the transmission mode, except that the comparator 42 continuously compares the output from the amplifier 21 with the reference voltage from the voltage generator 41 without sampling and holding each peak of the output signal. Hence, upon detecting a stable increase in the amplitude of the output signal from the receiving transducer 8, the section D switches the system from the reflection mode to the transmission mode.

More specifically, the mode switching control 44 transfers a signal to the switches $S_3$ through $S_7$, thus establishing a connection between their respective movable contacts and the first stationary contacts I. The signal also serves to put the beam direction controller 18 into operation and enables the pulse generator 16 to supply pulses to the modulator 15.

In response to the switching signal, the comparator 42 also functions back to sample and hold each peak of signal to be compared.

Figure 8A:
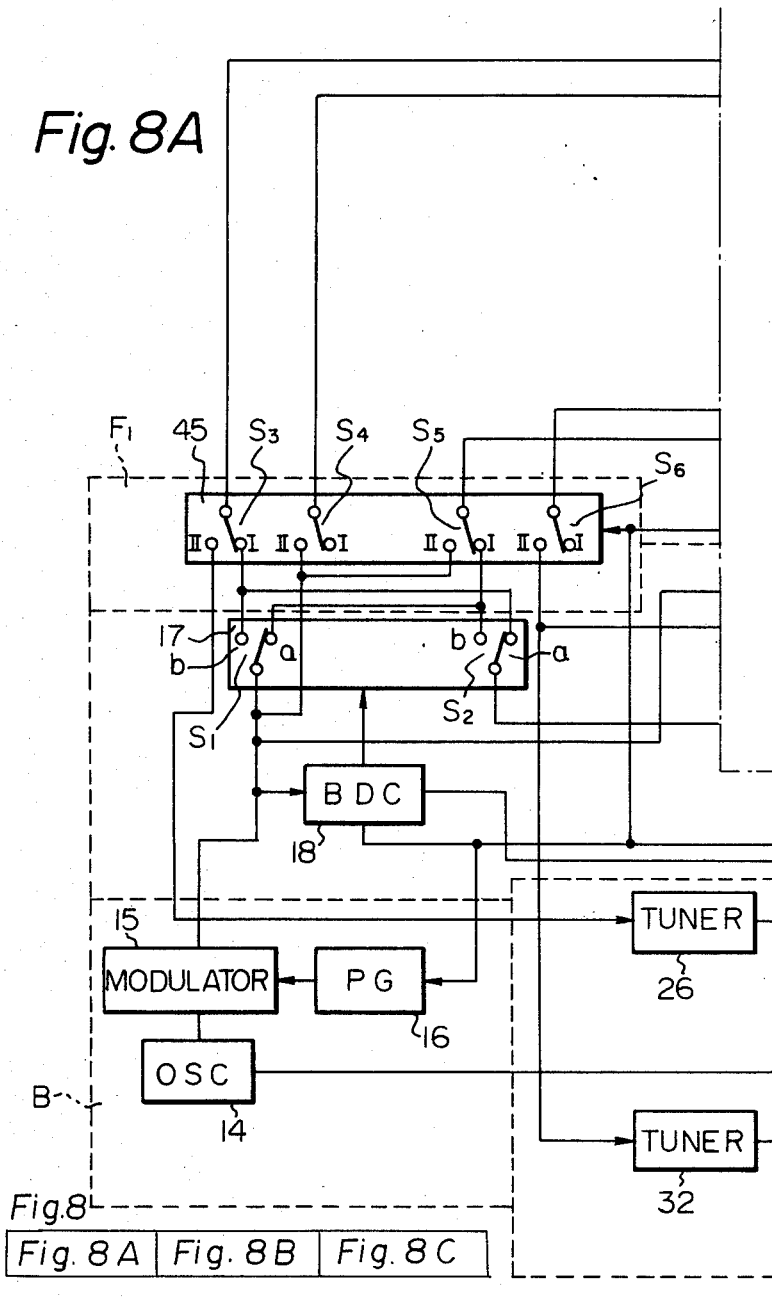
Figure 8C:
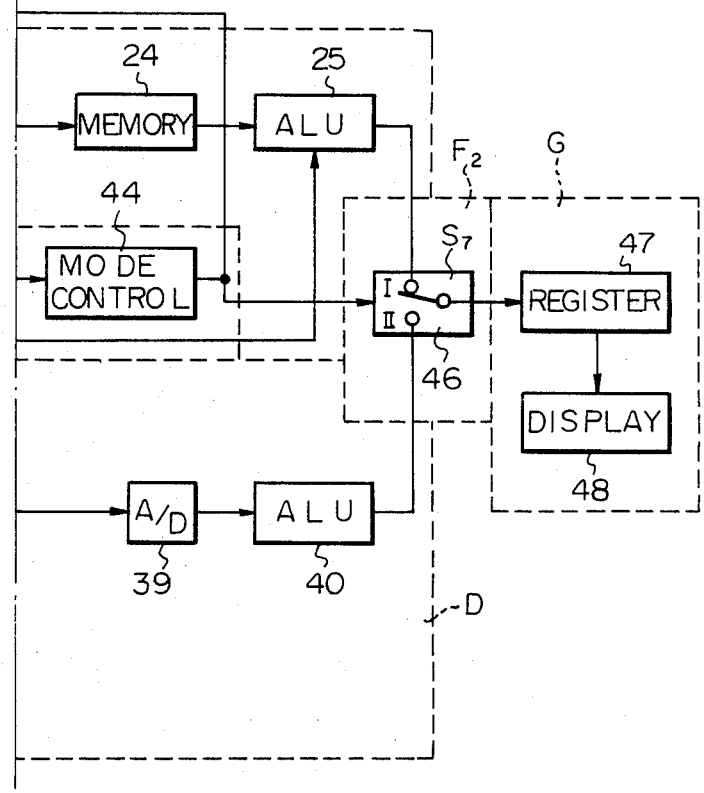

FIGS. 8A, 8B and 8C are a block diagram illustrating still another embodiment of the inventon. In this embodiment, a mode switching circuit 45 comprises switches $S_3$ through $S_6$. A beam direction switching circuit 17 comprises switches $S_1$ and $S_2$. A movable contact of a switch $S_1$ is connected to a modulator 15, a beam direction controller 18, and second stationary contacts II of respective switches $S_4$ and $S_5$. A stationary contact a of the switch $S_1$ is connected to a first stationary contact I of the switch $S_5$ and a stationary contact b of the switch $S_2$. A stationary contact b of the switch $S_1$ is connected to a first stationary contact I of the switch $S_3$ and a stationary contact a of the switch $S_2$. A movable contact of the switch $S_2$ is connected to a tuner 19. A second contact II of the switch $S_3$ is connected to a first tuner 26 in the reflection mode signal section D, While a second contact II of the switch $S_6$ is connected to a second tuner 32 and a tuner 19.

Movable contacts of the switches $S_3$ through $S_6$ are connected to a transmitting and receiving transducer 8', a transmitting transducer 6, a transmitting and receiving transducer 11' (hereinafter to be referred to simply "transceiver transducer"), and a receiving transducer 10, respectively.

In other respects, the construction of the present embodiment is identical with that of the previous embodiment in FIGS. 6A, 6B and 6C. Accordingly, like numerals in FIGS. (6A, 6B, 6C) and (8A, 8B, 8C) represent like elements.

In the transmission mode, the movable contacts of switches $S_3$ and $S_4$ are respectively connected to the first stationary contacts I thereof. Further, the movable contacts of switches $S_1$ and $S_2$ are cyclically connected alternatively to either one of the contacts a and b thereof at desired periods.

In a period during which the movable contacts of the switches $S_1$ and $S_2$ are connected to the stationary contacts a thereof, a pulse train from the modulator 15 is fed through the stationary contact a of the switch $S_1$ and through the first contact I of the switch $S_5$ and to the transceiver transducer 11' which responds as a transmitter to transmit an ultrasonic signal along the path 7.

In response to the ultrasonic signal, the transceiver receiver 8' operates as a receiver and, thus converts the ultrasonic signal into an electric signal which is, then, fed through the first stationary contact I of the switch $S_3$ and the stationary contact a of the switch $S_2$ to the tuner 19.

In another period during which the movable contacts of the switches $S_1$ and $S_2$ are connected to the stationary contacts thereof, the pulse train from the modulator 15 is fed through the stationary contact b of the switch $S_1$ and through the first contact I of the switch $S_3$ and to the transducer 8' which responds as a transmitter to transmit an ultrasonic signal. At this time, the transceiver transducer 11' operates as a receiver rather than a transmitter as described above, and, thus, supplies the output signal through the first stationary contact I of the switch $S_5$ and the stationary contact b of the switch $S_2$ to the tuner 19.

In the reflection mode, the movable contacts of the switches $S_3$ through $S_6$ are respectively connected to the second stationary contacts II thereof. In this position, switching circuit 17 does not participate in the operation of the system.

As described in connection with the embodiment in FIG. 6, a continuous sinusoidal signal from the carrier 14 is not modulated by pulses as described, and is fed through the second stationary contact II of the switch $S_4$ to the transmitter transducer 6 as well as the transceiver transducer 11' via the second stationary contact II of the switch $S_5$.

The ultrasonic signal from the transducer is then reflected as described, and received by the transducer 8' serving now as a receiver which then converts the ultrasonic signal into an electric signal. The electric signal is fed through the second stationary contact II of the switch $S_3$ to the first tuner 26.

Similarly, in response to the ultrasonic signal from the transceiver transducer 11', which is operating as a transmitter, the receiving transducer 10 outputs a corresponding electric signal which is fed through the second stationary contact II of the switch $S_6$ to the second tuner 32 in the reflection mode signal processing section.

It is noted that the ultrasonic beam of the embodiment as illustrated in FIG. 8B uses a single path of travel (as indicated by 7) in the transmission mode while the ultrasonic beam of the embodiment in FIGS. 9A and 9B uses either of two paths of travel (as indicated by 4 and 7). The single path arrangement is highly advantageous because the distance of travel for the ultrasonic beam from the transmitter to the receiver through the fluid does not change at all between the upstream and downstream travels of the beam.

Also, it is noted that the embodiment as illustrated in FIGS. 8A, 8B and 8C uses a transducer combination of two transceivers (8', 11'), one transmitter (6) and one receiver (10).

Figure 10:
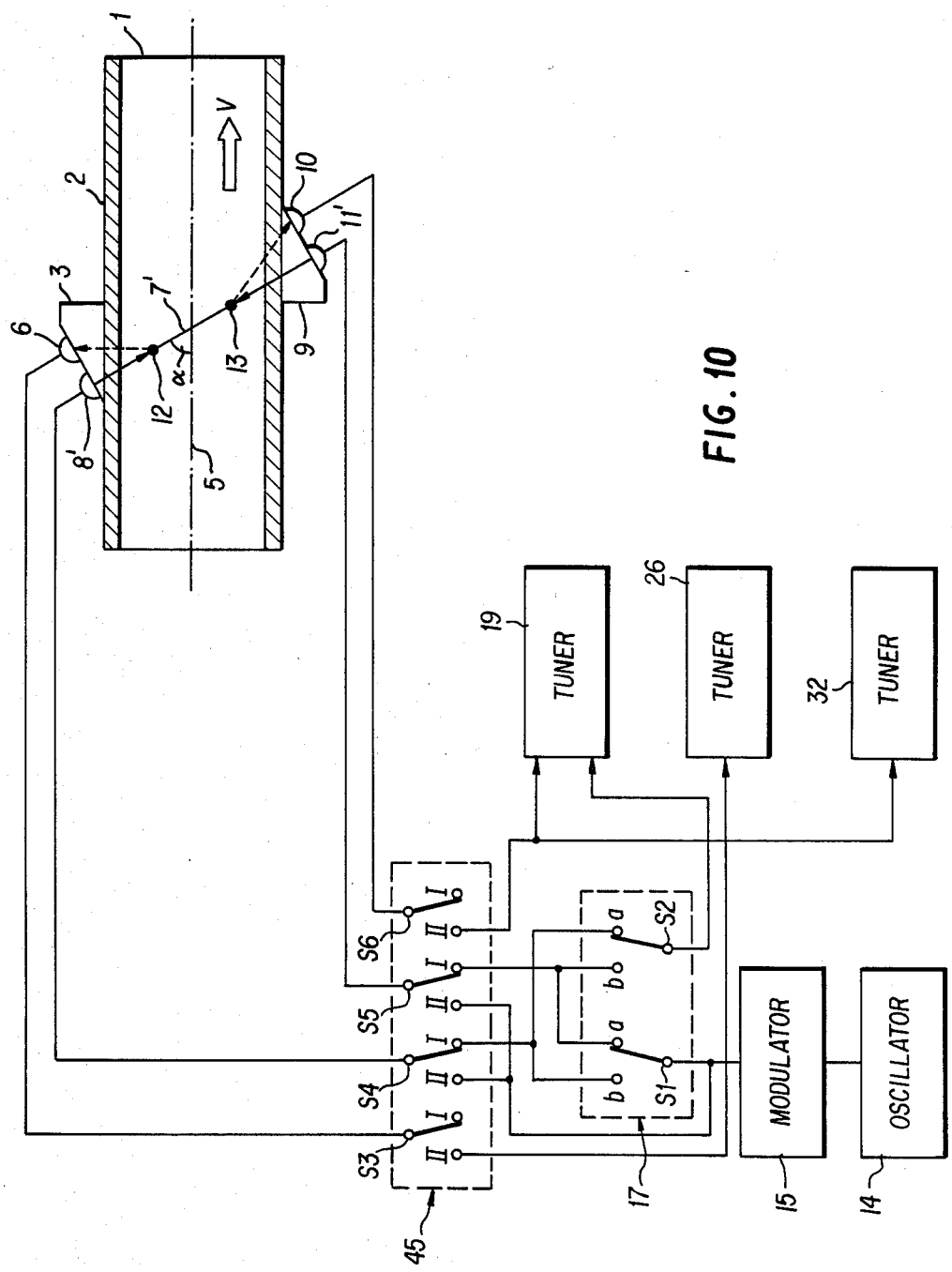
FIG. 10 is a block diagram showing a portion of another embodiment of this invention wherein the tuners 19, 26 and 32 may be connected to the amplifiers 21, 28 and 34 in FIG. 8, respectively.

Of course, other transducer combinations that use only one path of travel of the ultrasonic beam in the transmission mode can be designed and employed. An example of such combintion is a transducer combination of two transceivers and two receivers. This example is shown in FIG. 10 wherein a first transceiver is designated by 8', a first receiver disposed close to and slightly downstream relative to the first transcriver is designated by 6, a second transceiver separated by the fluid from the transducers 6 and 8' is designated by 11', and a second receiver disposed close to and slightly downstream relative to the second transceiver is designated by 10. Three tuners designated by 19, 26 and 32 in FIG. 10 may be connected to the amplifiers 21, 28 and 32 in FIG. 8 respectively. In this combination and arrangement of transducers, the first and second transceivers 8' and 11' alternately and complementarily transmit an ultrasonic beam into the fluid and receive the transmission mode signal whenever the system is being operated in the transmission mode. In the reflection mode, both of the first and second transceivers 8' and 11' always operate as "transmitters" and the first and second receivers 6 and 10 receive the reflection mode signals originally transmitted from the first and second transceivers 8' and 11', respectively. Yet another transducer combination utilizing a single path of travel of ultrasonic beam (such as the path 7 in FIG. 8) may be two transceiver transducers and two transmitter transducers.

Of course the respective examples need modified switching circuits as modified from the switching circuits 45 and 17 in FIG. 8A. Such modification of switching circuits is obvious to those skilled in the art.

FIGS. 9A and 9B are block diagram showing circuit components of this invention according to another embodiment, wherein the mode switching circuit 45 of the mode switch section $F_1$ is composed of only one switch $S_3$, and the beam direction switching circuit 17 of the transmission measurement mode signal processing section C is composed of switches $S_1$ and $S_2$. The movable contact of the switch $S_1$ is connected to the pulse modulator 15. The fixed contact a of the switch $S_1$ is connected to the movable contact of the switch $S_3$ and the downstream-positioned transmitter transducer 11. The fixed contact b of the switch $S_1$ is connected to the fixed contact II of the switch $S_3$ and the upstream-positioned transmitting transducer 6. The movable contact of the switch $S_2$ is connected to the tuner 19. The fixed contact a of the switch $S_2$ is connected to the upstream-positioned receiver transducer 8, and the fixed contact b of the switch $S_2$ is connected to the downstream-positioned receiving transducer 10.

The reflection measurement mode signal processing section D is composed of a mixer 29' connected to the oscillator 14 and amplifier 21, a low-pass filter 30' connected to said mixer, a frequency-to-voltage converter 31' connected to said filter, an analog-digital converter 49 connected to said frequency-to-voltage converter, a memory 50 connected to said analog-digital converter, and an ALU 40' connected to said memory. The beam direction switching control 18 of the transmission mode signal processing section C is connected to the pulse generator 16 rather than the mode switching control 44. The components common to both FIGS. (6A, 6B, 6C) and (9A, 9B) are identified by like symbols.

For operation in transmission mode, the movable contact of the switch $S_3$ is kept connected to the fixed contact I and as in the first embodiment, the movable contacts of the switches $S_1$ and $S_2$ are alternately connected to the respective fixed contacts a and b at given intervals. Therefore, in a period of measurement when the movable contacts of the switches $S_1$ and $S_2$ are connected to the respective fixed contacts a, the pulse train from the modulator 15 is supplied through the fixed contact a of the switch $S_1$ to the downstream transmitting transducer 11 which converts the pulse train into an ultrasonic signal. The ultrasonic signal is supplied to the upstream receiving transducer 8 which converts the signal into an electrical signal to be supplied to the tuner 19 through the fixed contact a of the switch $S_2$.

In a period of measurement when the movable points of the switches $S_1$ and $S_2$ are connected to the respective fixed contacts b, the pulse train from the pulse modulator 15 is supplied through the fixed contact b of the switch $S_1$ to the upstream-positioned transmitter transducer 6 which converts the pulse train into an ultrasonic signal. The ultrasonic signal is supplied to the downstream-positioned receiving transducer 10 which converts the signal into an electrical signal to be supplied to the tuner 19 through the fixed contact b of the switch $S_2$.

The subsequent operation in the transmission measuring mode is identical with what is described in connection with the embodiment in FIGS. 6A, 6B and 6C.

For operation in reflection measuring mode, the movable contact of the switch $S_3$ is kept connected to the fixed contact II and the movable contacts of the switches $S_1$ and $S_2$ are connected alternately to the respective fixed contacts a and b at given intervals. As in the case of the embodiments in FIGS. 6 and 8, the pulse modulator 15 delivers a sinusoidal signal continuously. In a period of measurement when the movable contacts of the switches $S_1$ and $S_2$ are connected to the respective fixed contacts a, the sinusoidal signal from the modulator 15 is supplied to the upstream-positioned transmitter transducer 6 through the fixed contact a of the switch $S_1$ and the fixed contact II of the switch $S_3$, while at the same time, the signal is supplied to the downstream-positioned transmitting transducer 11 through the fixed contact a of the switch $S_1$. The upstream-positioned receiver transducer 8 receives the reflected wave of the ultrasonic signal sent from the upstream-positioned transmitting transducer 6 and converts such wave into an electrical signal which is supplied to the tuner 19 through the fixed contact a of the switch $S_2$. The electrical signal delivered from the downstream-positioned receiving transducer 10 is neutral to the operation of the system because the fixed contact b of the switch $S_2$ is open. The tuner 19, automatic gain control 20 and the amplifier 21 operate in an identical manner to the first tuner 26, automatic gain control 27 and amplifier 28 of the embodiments in FIGS. (6A, 6B, 6C) and (8A, 8B, 8C), and the mixer 29' is supplied with a sinusoidal signal having the Doppler shift due to a reduction in frequency. The mixer 29' is also supplied with a sinusoidal signal from the oscillator 14, so it combines the two sinusoidal signals and delivers a first beat signal. As in the embodiments in FIGS. (6A, 6B, 6C) and (8A, 8B, 8C), the first beat signals are supplied to the low-pass filter 30' and frequency-to-voltage converter 31'. In the period of measurement described above, the frequency-to-voltage converter 31' produces an analog voltage of positive polarity that is proportional to the frequency of the first beat signal having the Doppler shift due to a reduction in frequency. The analog-digital converter 49 converts the analog voltage to a digital code which is forwarded to the memory 50. The memory 50 stores the digital code till the end of the subsequent period of measurement.

In the period of measurement described above, by counting a train of pulses produced from the pulse generator 16, the beam direction switching control 18 detects the lapse of the given period of measurement and supplies the beam direction switching element 17 with a control signal serving as a beam direction switching signal to thereby connect the movable contacts of the switches $S_1$ and $S_2$ to the respective fixed contact b.

The above sequence starts the subsequent period of measurement wherein the sinusoidal signal delivered from the pulse modulator 15 is supplied to the upstream-positioned transmitter transducer 6 through the fixed contact b of the switch $S_1$, while at the same time, the signal is supplied to the downstream-positioned transmitting transducer 11 through the fixed contact b of the switch $S_1$ and the fixed contact II of the switch $S_3$. The electrical signal from the downstream-positioned receiving transducer 10 is supplied to the tuner 19 through the fixed contact b of the switch $S_2$. The electrical signal from the upstream-positioned receiving transducer 8 is neutral to the operation of the system because the fixed contact a of the switch $S_2$ is open. The automatic gain control 20 and the amplifier 21 operate in a manner identical to the operation of the first tuner 32, automatic gain control 33 and amplifier 34 of the embodiments in FIGS. 6 and 8, and the mixer 29' delivers a second beat signal having the Doppler shift due to a reduction in frequency, and the frequency-to-voltage converter 31' produces an analog voltage of negative polarity proportional to the frequency of the second beat signal. The analog-digital converter 49 converts said analog voltage of negative polarity to a digital code which is forwarded to the memory 50 for storage. Then, the beam direction switching control 18 detects the lapse of the given period of measurement and supplies a control signal to the beam direction switching element 17 which connects the movable contacts of the switches $S_1$ to $S_2$ to the respective fixed contacts a for starting the next period of measurement. The control signal is also supplied to the arithmetic unit 40' which then reads a digital code representing the analog voltage of positive polarity that corresponds to the first beat signal and digital code representing the analog voltage of negative polarity that corresponds to the second beat signal, and provides a serial digital code for the flow rate of the fluid 1 formed on the basis of the result of subtraction of the latter signal from the former. For the operation of the other circuit components, see the description of the embodiment given by reference to FIGS. 6A, 6B and 6C.

In the last embodiment illustrated above, the switches $S_1$, $S_2$, the tuner 19, automatic gain control 20 and amplifier 21 are used both in transmission measuring mode and in reflection measuring mode. In addition, the beam direction switching operation indispensable to transmission measuring mode is also effective in reflection measuring mode, and the mixer 29', low-pass filter 30' and frequency-to-voltage converter 31' are operated on a time-shared basis. Accordingly, one great economical advantage of this embodiment is that the number of the above mentioned six components required is half the number required in the embodiments in FIGS. (6A, 6B, 6C) and (8A, 8B, 8C).

In the embodiments of this invention, it is recommended that the switches $S_1$ to $S_7$ be composed of mercury-wetted contact relays that are more reliable than the conventional relay element. Alternatively, analog switches composed of a semi-conductor element may replace the mechanical contact type switching elements.

The system as exemplified in the latter three embodiments is capable of automatic selection between a measurement in transmission mode and a measurement in reflection mode depending upon the concentration of contaminants. Therefore, even if there is a change with time in the concentration of contaminants in the fluid, two separate units, one for measuring in transmission mode and the other for measuring in reflection mode, need not be used as in the conventional technique, and the flow rate of the fluid can be simply measured by one unit. This eases transportation, installation and operation of the system. Another advantage of automatic switching between the two measuring modes in that it achieves extended and continuous measurement and recording of the flow velocity (distance of travel/unit time) and/or flow rate (volume/unit time) of fluid wherein the concentration of contaminants or pollutants varies considerably with time. What is more, in the system of these embodiments, two sets of transmitter and receiver transducers which are indispensable to a measurement in transmission mode are positioned to face each other separated by the fluid and are also used effectively for measurement in reflection mode so as to suppress noise output due to the noise motion of particles and/or the fluid (zig-zag motion of particles, drift of fluid and etc.) and to double the signal output of measurement due to a velocity vector in the direction of fluid channel.

Accordingly, the system as described and shown respectively in FIGS. (6A, 6B, 6C), (8A, 8B, 8C), and (9A, 9B) provides a continuous measuring of the flow rate and/or flow velocity of the fluid with an improved S/N ratio and its performance is demonstratively beyond that of the prior-art ultrasonic flow measurement system.

Although the above have been described and shown, various other modifications and changes could be made without departing from the spirit and scope of the invention.

Thus, some of the advantages provided by the system of this invention are automatic continuous and accurate (high S/N ratio of signal) measurement of flow, applicability to fluid with a wide variation in number of contaminant particles and a compact size that is easy to transport and to install.

What is claimed is:

1. A Doppler-shift flow meter for use in measuring the velocity and/or rate of flow of a flowing fluid, said flow meter comprising:
   (a) means for generating an oscillatory electric signal having a frequency in the range of ultrasonic frequency,
   (b) a first transducer unit including a first ultrasonic transmitter having a first sending direction and a first ultrasonic receiver disposed close to said first ultrasonic transmitter and having a first receiving direction which forms an angle of substantially zero with said first sending direction for detecting a Doppler shifted signal having a frequency higher than the frequency of the input signal to said first ultrasonic transmitter,
   (c) a second transducer unit spaced from said first transducer unit with the fluid therebetween, and including a second ultrasonic transmitter having a second sending direction and a second ultrasonic receiver disposed close to said second ultrasonic transmitter and having a second receiving direction which forms an angle of substantially zero with said second sending direction for detecting a Doppler shifted signal having a frequency lower than the frequency of the input signal to said second ultrasonic transmitter,
   (d) means for obtaining a first Doppler shift $(+\Delta f_1)$ defined by the difference in frequency between the input and output signals of said first transducer unit and for obtaining a second Doppler shift $(-\Delta f_2)$ defined by the difference in frequency between the input and output signals of said second transducer unit, and
   (e) signal emphasizing means for producing the difference between said first and second Doppler shifts $(+\Delta f_1 + \Delta f_2)$, thus substantially doubling the value.

2. A flow meter as claimed in claim 1 wherein said first and second transducer units are disposed in a noise cancellable position in which first and second bodies of the fluid observed respectively by said first and second ultrasonic receivers move generally in symmetry with respect to the central axis of the fluid flow, thus assuring that the noise component of the Doppler shifted signal detected by said first ultrasonic receiver assumes characteristics of frequency variation similar to those assumed by the noise component of the Doppler shifted signal detected by said second ultrasonic receiver.

3. A flow meter system as claimed in claim 2 wherein said first and second transducer units are disposed generally on opposite sides of the flow path.

4. In an ultrasonic flow meter including transducer means mounted on the edge of a flow path of a fluid and having ultrasonic transmitting and receiving means for feeding an ultrasonic signal to the fluid and receiving the fed-back ultrasonic signals that have traveled through the fluid, and means electrically coupled with the receiver transducer means for processing the electric signals thereof into signals representing the velocity of the flow and/or the rate of the flow of the fluid, the improvement comprising:

(a) said transducer means including
  (i) a first transducer unit and
  (ii) a second transducer unit separated by the fluid from said first transducer unit and disposed downstream relative to said first transducer unit so that said first transducer unit is aligned with the path of travel of ultrasonic waves transmitted from said second transducer unit whereas said second transducer unit is aligned with the path of travel of ultrasonic waves transmitted from said first transducer unit whereby in response to a first condition of the fluid said second transducer unit receives a first transmission mode ultrasonic signal from said first transducer unit whereas said first transducer unit receives a second transmission mode ultrasonic signal from said second transducer unit, and in response to a second condition of the fluid, said first transducer unit receives a first reflection mode ultrasonic signal reflected by a reflecting object or objects in the fluid on the way from said first transducer unit whereas said second transducer unit receives a second reflection mode ultrasonic signal reflected by a reflecting object or objects on the way from said second transducer unit; and (b) said signal processing means including
  (i) first means responsive to said first condition of the fluid for obtaining a signal representing the time difference between the time for the ultrasonic waves to travel downstream from said first transducer unit across the fluid flow path to said second transducer unit and the time for the ultrasonic waves to travel upstream from said second transducer unit across the fluid flow path to said first transducer unit, and
  (ii) second means responsive to said second condition of the fluid for obtaining first and second signals representing respectively a first Doppler shift as evidenced in said first reflection mode signal and a second Doppler shift as evidenced in said second reflection mode signal, and for obtaining a third signal representing the Doppler shift difference between said first and second Doppler shifts.

5. An ultrasonic flow meter as claimed in claim 4 further comprising mode control means coupled with said ultrasonic receiving means for comparing the strength or amplitude of the received signal with a reference level defining the critical point between said first and second conditions of the fluid and producing a mode switching signal when said strength or amplitude of the received signal crosses said reference level, whereby the flow meter is automatically switched between the transmission and reflection modes of operation and always operates in a desired one of said modes in accordance with the condition of the fluid, thus establishing a continuous measuring of flow irrespective of a wide variation in parameters defining the condition of the fluid.

6. An ultrasonic flow meter as claimed in claim 5 wherein the fluid comprises an industrial waste water and the condition of the fluid comprises the degree of pollution in the water.

7. An ultrasonic flow meter as claimed in claims 5 or 6, wherein said mode control means includes timer means for introducing a predetermined dead time thereby to disable said mode control means from producing said mode switching signal at the instant when the strength or amplitude of said received signal crosses said reference level and continues the disabling until said predetermined dead time has elapsed during which the strength or amplitude of said received signal is maintained at a level either higher or lower than said reference level.

8. An ultrasonic flow meter as claimed in claim 5 further including oscillator means for generating a continuous electric oscillatory signal having a frequency in the range of the ultrasonic frequency, modulator means connected between said oscillator means and said ultrasonic transmitting means and responsive to said mode switching signal for producing periodically intermittent waves of said electric oscillatory signal whenever the flow meter is being operated in said transmission mode and for allowing continuous waves of said electric oscillatory signal to pass therethrough whenever in said reflection mode.

9. An ultrasonic flow meter as claimed in claim 8 further including switching circuit means which is operably connected between said modulator means and said transducer means only when and whenever the flow meter is being operated in said transmission mode, and beam direction control means for periodically switching said circuit means between a first position in which only the ultrasonic transmitting means of said first transducer unit is energized to transmit a beam of ultrasonic waves downstream thereof and a second position in which only the ultrasonic transmitting means of said second transducer unit is energized to transmit a beam of ultrasonic waves upstream thereof.

10. An ultrasonic flow meter as claimed in claim 4 or 9 wherein said first processing means comprises tuner means coupled with said ultrasonic receiving means, AGC controlled amplifier coupled with said tuner means, pulse shaping means coupled with said amplifier means, counter means coupled with an electric and periodically intermittent signal in substantially a certain phase or timed relationship with the signal as supplied to said ultrasonic transmitting means and also coupled with the output signal from said pulse shaper in substantially a certain phase or timed relationship with the signal as received by said ultrasonic receiving means for measuring the time difference therebetween, and producing the corresponding digital code, memory means coupled with said counter means, and arithmetic and logic means coupled with said memory means.

11. An ultrasonic flow meter as claimed in claim 10 wherein said second processing means comprises mixing means, low-pass filtering means, frequency-to-voltage converting means, analog-to-digital converting means, memory means and arithmetic and logic means.

12. An ultrasonic flow meter as claimed in claims 5, 6, 8 or 9, wherein said first transducer unit includes a transmitter and a receiver disposed close to and downstream relative to said transmitter, and said second transducer unit includes a transmitter and a receiver disposed close to and downstream relative to said transmitter whereby in the transmission mode, said transmitter of said first transducer unit transmits a beam of ultrasonic waves, which travels along a first path and is received by said receiver of said second transducer unit whereas said transmitter of said second transducer unit transmits a beam of ultrasonic waves, which travels along a second path which is generally parallel to said first path and is received by said receiver of said first transducer unit, and in the reflection mode, the geam of ultrasonic waves from said transmitter of said first transducer unit is reflected on the way and received by said receiver of said first transducer unit whereas the beam of ultrasonic waves from said transmitter of said second transducer unit is reflected on the way and received by said receiver of said second transducer unit.

13. An ultrasonic flow meter as claimed in claim 10 wherein said second processing means comprises mixing means, low-pass filtering means, frequency-to-voltage converting means, analog-to-digital converting means, memory means and arithmetic and logic means.

14. An ultrasonic flow meter as claimed in claim 9 wherein said first transducer unit includes a transceiver and a transmitter disposed close to and upstream relative to said transceiver, and said second transducer unit includes a transceiver and a receiver disposed close to and downstream relative to said transceiver, whereby when in the transmission mode, an ultrasonic beam is transmitted by said transceiver of said first transducer unit and travels across the fluid path and downstream along a path and is received by said transceiver of said second transducer unit during downstream beam direction periods whereas during upstream beam direction periods an ultrasonic beam is transmitted by said transceiver of said second transducer unit and travels across the fluid path and upstream along the same path as during downstream beam direction periods and is received by said transceiver of said first transducer unit, and when in the reflection mode, an ultrasonic beam is transmitted by said transmitter of said first transducer unit and is reflected on the way and received by said transceiver of said first transducer unit whereas an ultrasonic beam is transmitted by said transceiver of said second transducer unit and is reflected on the way and received by said receiver of said second transducer unit.

15. An ultrasonic flow meter as claimed in claim 9 wherein said first transducer unit includes a transceiver and a receiver disposed close to and downstream relative to said transceiver ad said second transducer unit also includes a transceiver and a receiver disposed close to and downstream relative to said transceiver, whereby when in the transmission mode, an ultrasonic beam travels along a single path between said transceivers in the direction across and downstream for first beam direction periods and in the opposite direction or second beam direction periods, and when in the reflection mode, an ultrasonic beam from said transceiver of said first transducer unit is reflected on the way and received by said receiver of said first transducer unit whereas an ultrasonic beam from said transceiver of said second transducer unit is reflected on the way and received by said receiver of said second transducer unit.

16. An ultrasonic flow meter as claimed in claim 4 wherein said first transducer unit includes a transmitter transducer and a receiver transducer, and said second transducer unit includes a transmitter transducer and a receiver transducer.

17. An ultrasonic flow meter as claimed in claim 4 wherein said first transducer unit includes a transmitter transducer and a transceiver transducer, and said second transducer unit includes a receiver transducer and a transceiver transducer.

18. A ultrasonic flow meter as claimed in claim 4 wherein said first transducer unit includes a transceiver transducer and a receiver transducer, and said second transducer unit includes a transceiver transducer and a receiver transducer.

19. An ultrasonic flow measurement system for measuring the velocity of the flow and/or the rate of the flow of a fluid to be tested comprising:
(a) means for supplying ultrasonic signals through the fluid and receiving ultrasonic signals that have traveled through the fluid, the received signal being either a reflection mode signal generated by reflection of the supplied signal by a reflecting object or objects in the fluid or a transmission mode signal which is a supplied signal that has traveled without being reflected, said means including a first transmitter transducer for transmitting an ultrasonic signal through the fluid along a first path, a first receiver transducer disposed adjacent to said first transmitter transducer and aligned with a second path generally parallel to and adjacent to said first path for receiving ultrasonic signals incident thereon along the second path, a second transmitter trransducer for transmitting an ultrasonic signal through the fluid along the second path, and a second receiver transducer disposed adjacent to said second transmitter transducer and aligned with said first path for receiving ultrasonic signals incident thereon along the first path;
(b) first signal processing means operatively coupled with said first and second receiver transducers for processing the reflection mode signals into signals representing the velocity of flow of the fluid, said first signal processing means including means for producing first and second beat signals representing the first Doppler shift and second Doppler shift, respectively, means coupled with said beat signal producing means for producing the difference signal representing accurately the signal component of the first and second Doppler shifts while cancelling substantially the noise component thereof, and means coupled with said differential means for correcting the signal component by introducing a predetermined arithmetic and logic operation thereto whereby the resultant signal represents the velocity of flow and/or the rate of flow;
(c) second signal processing means operatively coupled with said first and second receiver transducers for processing the transmission mode signals into signals representing the velocity of flow and/or flow rate of the fluid, said second signal processing means including means for producing first and second time signals representing the first time of ultrasonic propagation or travel from said first transmitter transducer to said second receiver transducer, and the second time of ultrasonic propagation or travel from said second transmitter transducer to said first receiver respectively, time difference means for producing a signal representing the time difference between the first time and second time, and means coupled with said time difference means for correcting the time difference signal by introducing a second predetermined arithmetic and logic operation whereby the corrected signal represents the velocity of flow and/or the rate of flow of the liquid; and (d) mode switching means for switching the system between the reflection mode and the transmission mode, said mode switching means including means for detecting a critical level of pollution determined by the number of said reflecting objects existing in a unit volume of the fluid by comparing the amplitude or strength of the received ultrasonic signal with a reference level, means coupled with said detecting means for producing a switching signal whereby the system is automatically switched between the two modes of operation in accordance with the number of the reflecting objects contained in the fluid.

* * * * *